United States Patent
Matsumoto et al.

(10) Patent No.: US 7,477,137 B2
(45) Date of Patent: Jan. 13, 2009

(54) BLIND-SPOT DETECTION SYSTEM FOR VEHICLE

(75) Inventors: Seiji Matsumoto, Fuchu-cho (JP);
Takayuki Seto, Fucho-cho (JP);
Yoshikazu Nobutoki, Fuchu-cho (JP);
Takayuki Sato, Fuchu-cho (JP);
Kazunori Isomoto, Fuchu-cho (JP);
Yasuhiro Enno, Fuchu-cho (JP)

(73) Assignee: Mazda Motor Corporation (JP)

( * ) Notice: Subject to any disclaimer, the term of this patent is extended or adjusted under 35 U.S.C. 154(b) by 230 days.

(21) Appl. No.: 11/472,557

(22) Filed: Jun. 22, 2006

(65) Prior Publication Data
US 2006/0290482 A1 Dec. 28, 2006

(30) Foreign Application Priority Data

| Jun. 23, 2005 | (JP) | ............................. 2005-184116 |
| Jun. 23, 2005 | (JP) | ............................. 2005-184124 |
| Jun. 23, 2005 | (JP) | ............................. 2005-184134 |
| Jun. 29, 2005 | (JP) | ............................. 2005-190487 |
| Jul. 1, 2005 | (JP) | ............................. 2005-194007 |
| Jul. 1, 2005 | (JP) | ............................. 2005-194008 |

(51) Int. Cl.
*B60Q 1/00* (2006.01)

(52) U.S. Cl. .................. 340/436; 340/435; 340/903; 340/472; 280/735

(58) Field of Classification Search ............. 340/435, 340/436, 438, 472, 903, 905, 901; 280/735, 280/734, 728.1; 180/282, 271, 167, 169
See application file for complete search history.

(56) References Cited

U.S. PATENT DOCUMENTS

| 5,173,881 A | * | 12/1992 | Sindle | ........................ 367/101 |
| 5,223,814 A | * | 6/1993 | Suman | ........................ 340/525 |
| 5,313,335 A | * | 5/1994 | Gray et al. | ................... 359/839 |
| 6,198,409 B1 | * | 3/2001 | Schofield et al. | ............ 340/903 |
| 6,291,906 B1 | * | 9/2001 | Marcus et al. | ............. 307/10.1 |
| 2002/0080018 A1 | | 6/2002 | Yamazaki | |
| 2004/0080431 A1 | | 4/2004 | White | |

FOREIGN PATENT DOCUMENTS

| DE | 19623469 A1 | 1/1997 |
| JP | 2002-074596 | 3/2002 |
| JP | 2004-149108 | 5/2004 |

OTHER PUBLICATIONS

European Search Report, EP 06012890, Dated Oct. 13, 2006.

* cited by examiner

*Primary Examiner*—Anh V La
(74) *Attorney, Agent, or Firm*—Studebaker & Brackett PC; Donald R. Studebaker

(57) ABSTRACT

Disclosed is a BSD system for vehicle provided with a blind spot detection module which includes obstacle in blind spot detection unit for detecting an obstacle existing in a blind spot around the rear side of a self vehicle and an obstacle indicator disposed on a side mirror of the self vehicle and adapted to display at least one of information for the existence of an obstacle in the blind spot, for a distance between the obstacle and the self vehicle, and for a relative speed of the obstacle to the self vehicle, the blind-spot detection system for vehicle. This system is provided with a unit for detecting that the blind spot detection module is in an abnormal operation state and a unit disposed on the side mirror having the obstacle indicator and adapted to visually indicate an abnormality of the blind spot detection module detected by the abnormality detection unit.

24 Claims, 23 Drawing Sheets

BLIND-SPOT DETECTION SYSTEM FOR VEHICLE

BACKGROUND OF THE INVENTION

1. Field of the Invention

The present invention relates to a blind-spot detection (BSD) system for vehicle having an obstacle indicator for displaying information relevant to an obstacle existing in a blind spot around a vehicle driver.

2. Description of the Related Art

Heretofore, there has been known a vehicle equipped with a BSD system for supporting vehicle safety-driving. For example, US Patent Application No. 2002/281880 discloses a distance measuring and display system designed to indicate a distance between a driver's vehicle or self vehicle and obstacles, and a direction toward the obstacles, on a side view mirror or a rearview mirror.

In the conventional BSD system alarms the obstacle's existence in the blind corner for the driver such as rear side zone in response to operations of a turn-indicator lever or a steering wheel in case the driver intends to change the direction toward which the driver's vehicle closes to the obstacle. By utilizing the BSD system, safe operations are enhanced as collision or contact with an obstacle at a timing of lane changes and right/left turns can be avoided. The BSD system is provided with an obstacle indicator including a display for displaying information relevant to an obstacle, and a failure warning unit for warning of a failure occurring in the obstacle indicator. The display is mounted on a side mirror or door mirror of the vehicle. The failure warning unit is mounted on an instrument panel in front of a driver's seat. This layout makes it difficult for a driver to check simultaneously the display and the failure warning unit. Therefore, in the conventional BSD system, the difficulty for driver is inevitable in reliably make sure whether or not the obstacle indicator is in a failed state when the driver is watching the display on the door mirror. Moreover, it is quite difficult for the driver to perceive the occurrence of a failure in the obstacle indicator, due to the failure warning unit mounted on the instrument panel together with a plurality of warning means for warning of respective failures in various other in-vehicle systems, such as an antilock braking system (ABS) and a traction control (TRC) system.

Accordingly, it is an object of the present invention to provide a blind-spot detection system for vehicle capable of allowing a driver to perceive a failure occurring in an obstacle indicator, readily and reliably.

SUMMARY OF THE INVENTION

The present invention is directed to a blind-spot detection system for vehicle provided with a blind spot detection module which includes obstacle in blind spot detection means for detecting an obstacle existing in a blind spot around the rear side of a self vehicle and an obstacle indicator disposed on a side mirror of the self vehicle and adapted to display at least one of information for the existence of an obstacle in the blind spot, for a distance between said obstacle and the self vehicle, and for a relative speed of said obstacle to the self vehicle, said blind-spot detection system for vehicle. The blind-spot detection system for vehicle is provided with abnormality detection means for detecting that the blind spot detection module is in an abnormal operation state and warning means disposed on the side mirror having the obstacle indicator and adapted to visually indicate an abnormality of the blind spot detection module detected by the abnormality detection means.

In the above blind-spot detection system for vehicle of the present invention, the warning means in the side mirror is visually recognized simultaneously by a passenger when the passenger, particularly the driver of the vehicle visually checks the display means in the side mirror. In addition, the warning means is mounted on the side mirror having neither warning lamps nor meters except for the display means. Thus, an abnormality detected by warning means and indicated by the obstacle indicator can be readily recognized.

These and other objects, features and advantages of the invention will become more apparent upon reading the following detailed description along with the accompanying drawings in which:

Figure 1:
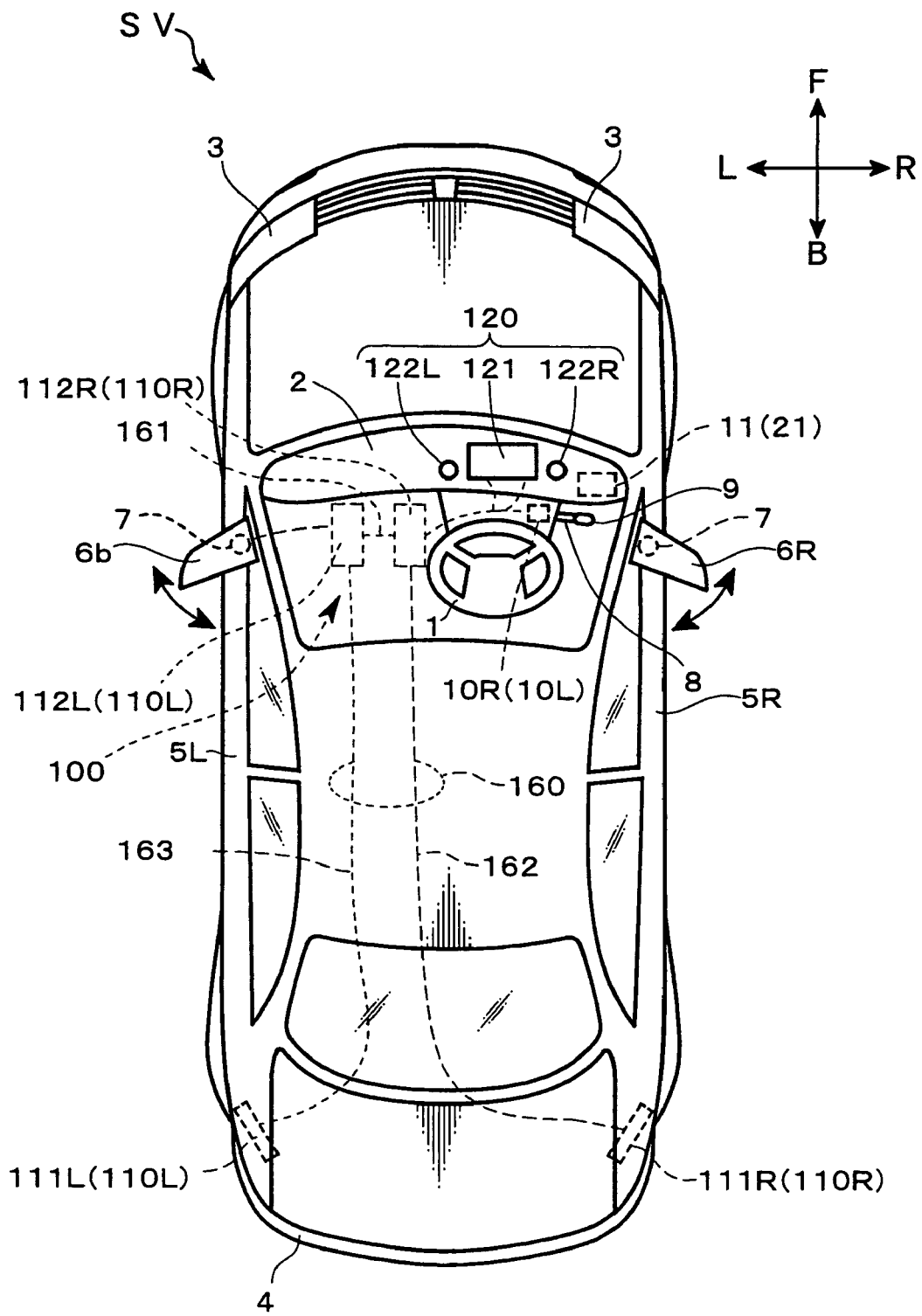
FIG. 1 is a schematic plan view showing a vehicle equipped with a BSD system of the present invention.

DETAILED DESCRIPTION OF THE PREFERRED
EMBODIMENTS OF THE INVENTION

With reference to the drawings, various preferred embodiments of the present invention will now be specifically described for illustrative purposes. It is to be understood that components or elements in these embodiments will be shown and described by way of examples only, but are not intended to limit this invention to them.

As used in this specification, the term "obstacle" collectively means obstructive objects likely to hinder driving of a driver's vehicle (self vehicle), such as other vehicles, animals, light vehicles including bicycles, or buildings.

The "information relevant to an obstacle" includes: information about whether or not an obstacle exists in a detection area SL and SL corresponding to a blind spot around a vehicle SV; information about a distance between the vehicle SV and the obstacle; and information about a relative speed of the obstacle to the vehicle SV.

In the following embodiments, a common component or element is designated by the same reference numerals, and its duplicate description will be omitted. Further, "L" or "R" is added to respective reference numerals of the same type of components, as needed, to discriminate whether or not each of them is a "left" component or a "right" component.

Referring to FIG. 1, a vehicle SV is a so-called right-hand-drive vehicle which is provided with a steering wheel 1 located on the right-hand side thereof. Alternatively, the present invention may be applied to a so-called left-hand drive vehicle which is equipped with a driver's seat located on the left-hand side thereof. An instrument panel 2 having various meters and switches is disposed in front of the steering wheel 1. The vehicle SV has a front end fitted with a pair of left and right headlights 3, and a rear end with a resin bumper 4 attached thereto.

A pair of left and right side mirrors or door mirrors 6 are mounted, respectively, to left and right front doors disposed on opposite sides of the vehicle SV. The door mirrors 6 are designed to be rotationally moved symmetrically with respect to a body of the vehicle SV by a door-mirror drive unit 7.

A turn-indicator lever 8 is disposed on the right side in front of the steering wheel 1. The turn-indicator lever 8 has a free end provided with a light switch 9 for turning on/off the headlights 3. The other end or base portion of the turn-indicator lever 8 is provided with a pair of turn-indicator switches 10. Each of the turn-indicator switches 10 is adapted to activate corresponding one of left and right turn-indicator sets (not shown) of the vehicle SV in response to a manual operation of the turn-indicator lever 8.

The instrument panel 2 is provided with a switch panel 11 on which various switches including an ignition switch 21 for an engine of the vehicle SV are mounted.

Figure 2:
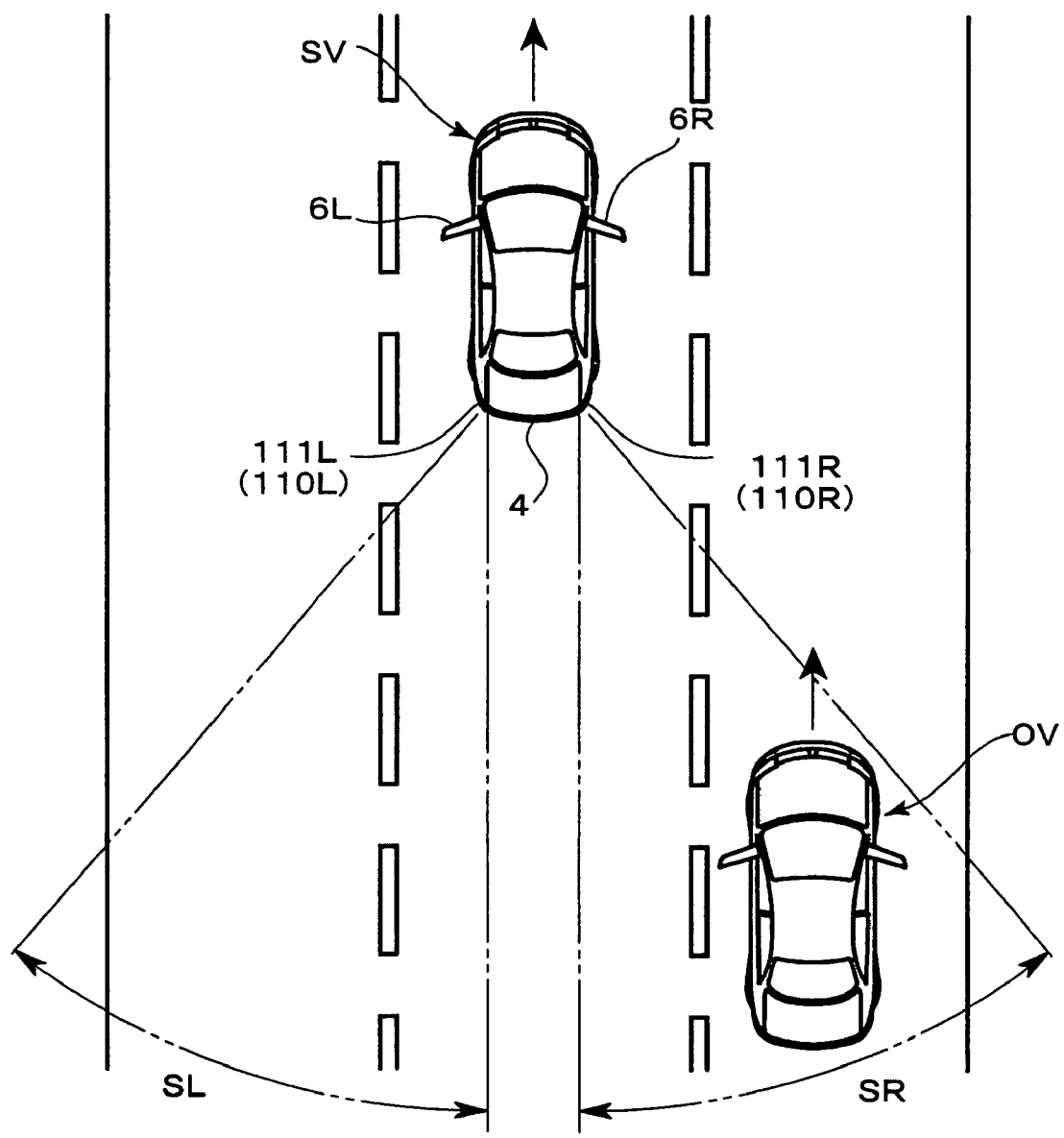
FIG. 2 is an explanatory plan diagrams showing a principle of the BSD system equipped in the vehicle illustrated in FIG. 1.
Figure 3:
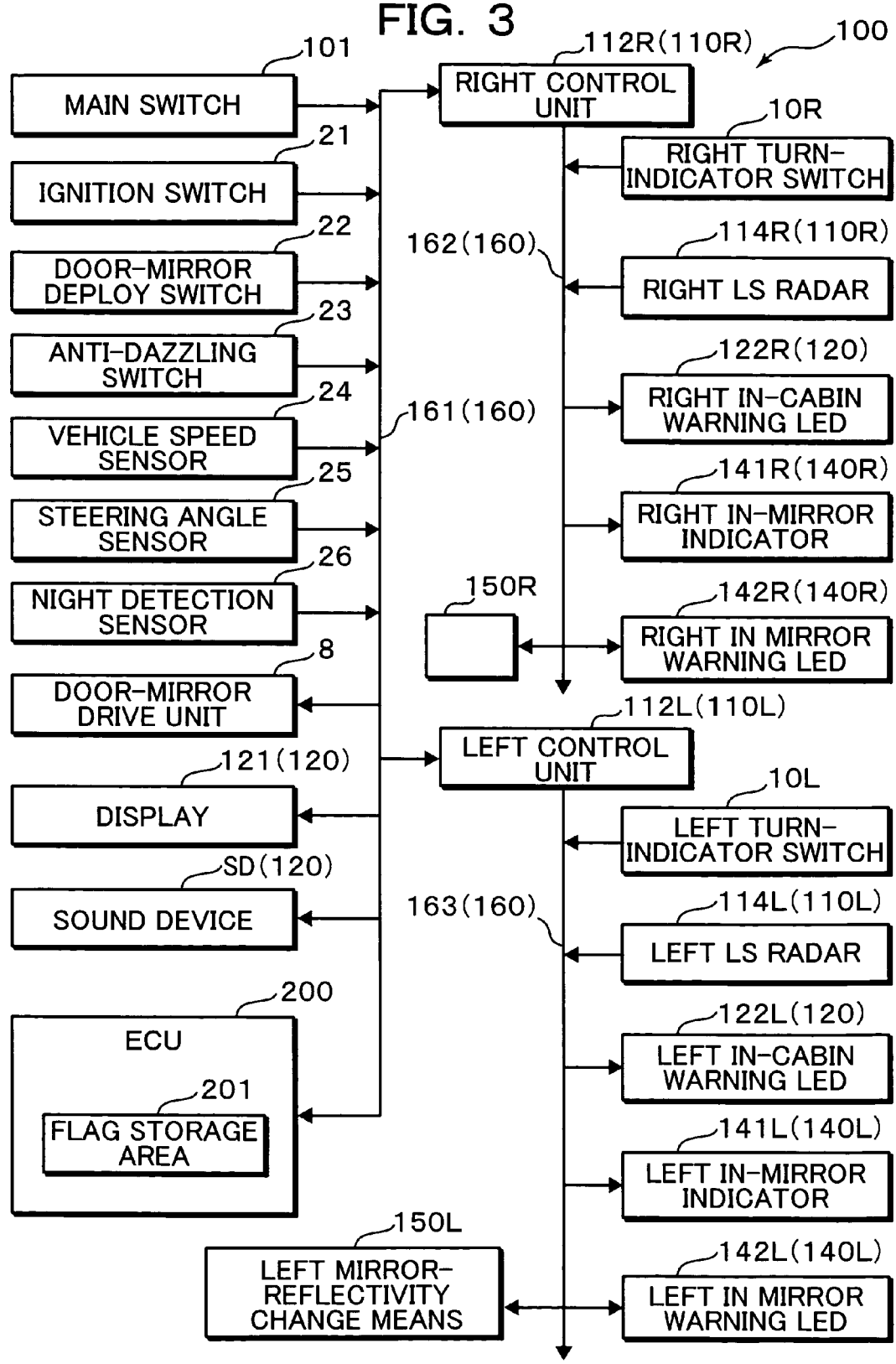
FIG. 3 is a block diagram showing the BSD system.

Referring to FIGS. 1 to 3, this vehicle SV is equipped with a BSD system 100 having a function of alerting a passenger (particularly a driver) of the vehicle SV, based on information relevant to an obstacle (e.g. another vehicle, a person or a guardrail) OV existing in blind spots in rear sides or rear-corner zones of the vehicle SV. This BSD system 100 includes a pair of BSD modules 110, an in-cabin and in-mirror alert elements 120 and 140 (see FIG. 3) which inform a processing result obtained by the BSD modules 110, and a wire harness 160 which is electrically connecting these components in such a manner as to allow to communicate therebetween. Each BSD module 110 is designed to be simultaneously turned ON/off according to a manual operation of a common main switch 101.

The BSD modules 110 include a control unit 112 for processing an output of a blind spot (BS) radar 111. As shown in FIG. 2, when another vehicle (obstacle) OV is traveling parallel to the driver's vehicle or self vehicle SV within a blind spot SL or SR around a rear corner zone of the vehicle body which is likely to be blind spot of the driver, each of the BSD modules 110 is operable to inform the passenger of the self vehicle SV of the existence of the adjacent vehicle OV so as to provide enhanced driving safety of the self vehicle.

Each of the BS radars 111 is a module which is compose, for example, of 24 GHz millimeter-wave radar, and housed, for example, in each of left and right corners of the resin rear bumper 4 attached to the rear end of the vehicle SV. Each of the BS radars 111 is connected to a corresponding one of the control units 112 to detect an obstacle in a corresponding one of the blind spots SL and SR. Specifically, each of the BS radars 111 is operable to emit a microwave toward the corresponding one of the blind spots SL and SR and sense a reflected wave thereof so as to detect whether or not an obstacle OV exists in the blind spot. The technique for detecting an obstacle in the blind spots SL and SR may include a reflected-wave sensing type detection technique using an electromagnetic wave, such as a millimeter wave other than the microwave, an ultrasonic wave or an infrared ray, and an image-analysis type detection technique using imaging means, such as a CCD camera. In the above microwave-based detection technique, the BS radars 111 can be housed in the rear bumper 4 which allows microwaves to readily transmit therethrough. This makes it possible to protect the BS radars 111 from external shock. It is understood that each of the BS radars 111 may be mounted on the vehicle body just below a rear combination lamp or on a rear portion of an exhaust chamber.

Each of the control units 112 comprises a CPU, a main storage device, an auxiliary storage device and an input/output device (these are not shown). Each of the control units 112 is operable to process information relevant to an obstacle OV detected from a corresponding one of the blind spots SL and SR by a corresponding one of the BS radars 111, so as to control after-mentioned output elements to alert the passenger. The left and right control units 112L and 112R are physically independent from each other, and electrically connected to each other through a sub-harness 161 in such a manner as to allow two-way two way communications therebetween.

The in-cabin alert element 120 includes a display 121, a pair of warning LEDs 122, and a sound device SD (see FIG. 3).

Figure 5:
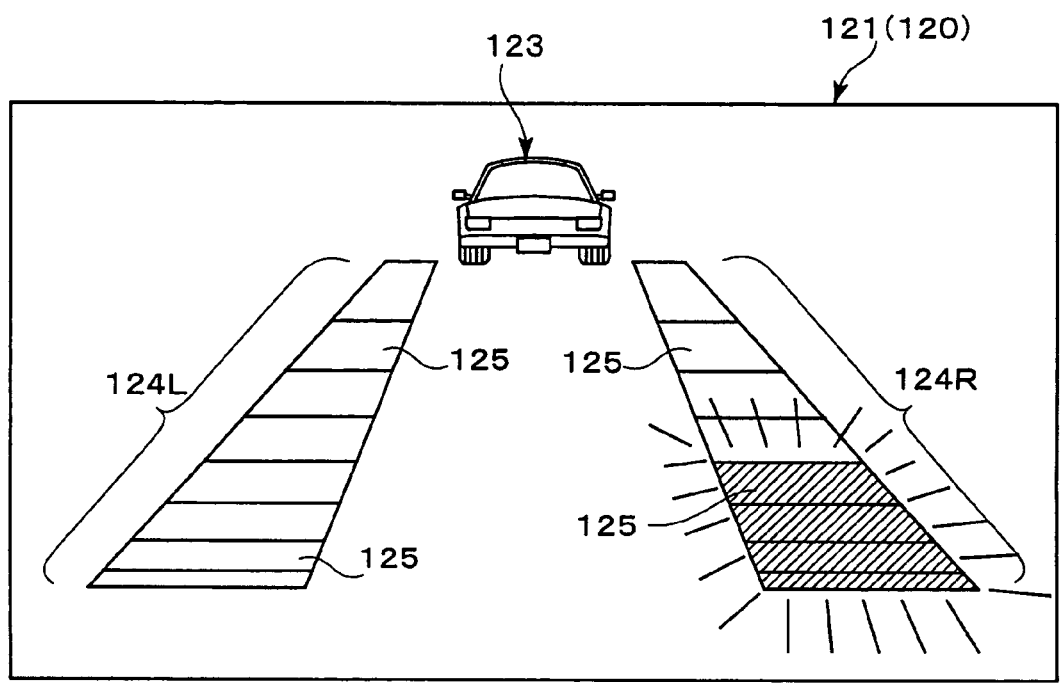
FIG. 5 is a schematic diagram showing a display in the BSD system.

For example, as shown in FIG. 5, the display 121 is designed to display an self-vehicle icon 123, a pair of left and right segmented-column icons 124 and a plurality of segment icons 125 in each of the segmented-column icons 124, associated with a Graphical User Interface (GUI). The self-vehicle icon 123 is disposed at the center of an upper region of a display screen, and the segmented-column icons 124 are displayed, respectively, on left and right sides of the self-vehicle icon 123 in perspective. As indicated by oblique lines in FIG. 5, each of the segmented-column icons 124 is designed to be illuminated with a certain color stepwise on a segment icon-by-segment icon basis according to a given program. Specifically, depending on a distance between the self vehicle and an obstacle OV detected by one of the BSD modules 110L and 110R, a corresponding number of the segment icons 125 are illuminated with the certain color to inform the passenger of the existence of and the distance to the obstacle OV. The control of these icons 123 to 125 is achieved based on a program which is installed in the auxiliary storage device and adapted to be executed by the CPU of the control unit 112 in each of the BSD modules 110. While the display 121 described in after-mentioned embodiments is primarily used as obstacle indicator means for displaying information relevant to an obstacle, the present invention is not limited to these embodiments, but the display 121 may be used as warning means for optically indicating a failure of the BSD modules 110.

The warning LEDs 122 are associated, respectively, with the BSD modules 110R and 110L. Specifically, the left and right warning LEDs 122L and 122R are adapted to be controllably turned ON, respectively, by the left BSD module 110L and the right BSD module 110R individually.

The sound device SD is mounted on the instrument panel 2 to sound an alarm about an obstacle. Specifically, the sound device SD may be a voice unit for informing the passenger of information relevant to an obstacle by voice formed through a signal processing. In the illustrated embodiment, a buzzer mounted on the instrument panel 2 is used as the sound device SD in a multipurpose manner.

The in-mirror alert element 140 is a display module capable of employing various configurations as described in detail later. At least the driver-side (right-side in the illustrated embodiment) in-mirror module 6R forms an in-mirror obstacle display unit 141, and an in-mirror warning LED 142 for warning of a failure occurring in the BSD system 100.

The wire harness 160 is an electric wiring system for unifying the BSD system and a vehicle control system of the vehicle SV. As is commonly known, this wire harness physically includes a plurality of sub-harnesses 161. A part of the sub-harnesses 161 is used for connecting the left and right control units 112 to each other to allow two way communications therebetween, and a part of the remaining sub-harnesses 161 is used for connecting the right BS radar 111R and the right control unit 112R to each other to allow two way communications therebetween. Further, a part of the remaining sub-harnesses 161 is used for connecting the left BS radar 111L and the left control unit 112L to each other to allow two way communications therebetween. These connection paths each formed of one or more independent sub-harnesses make it possible to provide a fault tolerance to each of the left and right BSD modules 110R and 110L, and allow each of the left and right control units 112 L and 112R to perceive a failure occurring in the other control unit, mutually.

The sub-harnesses 161 of the wire harness 160 are connected with a plurality of input elements which include the main switch 101 of the BSD system 100, the ignition switch 21 of the vehicle SV, a door-mirror deploying switch 22, an antiglare switch 23, a vehicle speed sensor 24, a steering angle sensor 25, and a night detection sensor 26. While it is preferable to physically connect these input elements to the sub-harness 161, a part or all of the input elements may be connected to either one of the sub-harnesses 162 and 163 of the left and right BSD modules 110R and 110L.

According to this embodiment, as shown in FIG. 1, the main switch 101 is a manual operation element, mounted on the switch panel 11 of the instrument panel 11, for turning on/off the BSD system 100 of the vehicle SV.

The ignition switch 21 is used for driving a starter motor for the engine, and mounted on a region of the instrument panel 2 on the side of the deriver's seat.

The door-mirror deploying switch 22 is disposed in the switch panel 11 of the instrument panel 2. The door-mirror deploying switch 22 is a manual operation switch for selectively folding and deploying the door mirrors 6, and also serves as means to detect whether or not the door mirrors 6 are in an deploy position, and output a signal representing the detected position to each of the control units 112 L and 112R.

The antiglare switch 23 is a manual operation switch to be used when the passenger feels that a headlight of a following vehicle OV is too dazzling in the nighttime or the like, and adapted to selectively reduce respective reflectivity of a rearview mirror and the door mirrors 6.

The vehicle speed sensor 24 is operable to detect a speed of the vehicle SV and output a signal representing the detected vehicle speed to each of the left and right control units 112R and 112L.

The steering sensor 25 is operable to detect a steering direction and a steering angle of the steering wheel 1 operated by the driver, and output a positive/negative angle signal representing the detected steering direction and angle to each of the left and right control units 112R and 112L.

Based on ON/OFF states of the light switch 9 for turning on/off the headlights 3, the night detection sensor 26 is operable to detect whether or not it is night and to output a signal representing the detected time-zone to each of the left and right control units 112R and 112L. Alternatively, a clock function, for example, in a vehicle navigation system, may be used as means to detect whether or not it is night. Further, recent years, a function of detecting a light intensity in the outside of a vehicle and automatically turning on a light switch when the detected light intensity becomes equal or less than a given threshold has already come into practical use. Thus, an activation signal for this light switch may be detected to cut out the need of the passenger's manual operation. Recently, nations are increasing, which oblige drivers to turn on headlights even in the daytime by laws. In this situation, the BSD system may be designed such that, when it is determined that the vehicle SV enters into such an area, based on information from an Intelligent Transport System (ITS), Road-to-Vehicle Communication (RVC) system or a vehicle navigation system, the light switch is automatically turned ON, and the night detection sensor 26 is simultaneously activate to output a pseudo-signal representing nighttime to each of the left and right control units 112R and 112L.

The sub-harness 161 is connected to an Electric Control Unit (ECU) 200 for the engine. In each of this and after-mentioned embodiments, the ECU 200 includes a main storage device having a failure-flag storage area 210 which is composed of a nonvolatile memory, and adapted to store a result on failure diagnosis of the BSD modules 110 and allow a microprocessor constituting the ECU 200 to refer to a failure flag F stored on the failure-flag storage area 210, when the ignition switch 21 is turned ON. Thus, even in OFF state of the main switch 101, the failure diagnosis of the BSD modules 110 can be achieved by the ECU 200. In the BSD system, the ECU 200 and the left and right control units 122 R and 122L are formed as a dual configuration allowing them to share the common data and simultaneously update the data. Further, the failure flag F is configured such that, when a certain failure occurs in either one of the BSD modules 110, a mode (type) and position of the failure is identified by a value thereof. Specifically, a normal state is defined by "0 (zero)". Further, a plurality of failure modes relating to the right BSD module 110R are defined by odd natural numbers, and the failure modes relating to the left BSD module 110L are defined by even natural numbers. More specifically, the failure flag F is configured to allow the failure position and failure mode (circuit disconnection, control defect, etc.) to be identified by a two-digit value. Furthermore, based on a value of the failure flag F, it can be determined whether or not the failure is serious or minor. For example, a circuit disconnection (or disconnection) and a malfunction of each sensor are evaluated as a serious failure, and a temporary defect in signal outputs of the BS radars 114 due to radio wave disturbance or hindrance is evaluated as a minor failure.

The sub-harness 161 of the wire harness 160 is connected with the display 121 which constitutes the in-cabin alert element 120 and serves as an output element. Each of the sub-harnesses 162 and 163 constituting the respective left and right BSD modules 110 is connected with a corresponding one of the turn-indicator switches 10 and a corresponding one of the BS radars 114, each of which serves as an input element, and further connected with a corresponding one of the warning LEDs 122 of the in-cabin alert element 120, and a corresponding one of the in-mirror warning LEDs 142, and a corresponding one of left and right mirror-reflectivity change means 150 or antiglare means, each of which serves as an output element. Thus, in the BSD system 100, the left and right BSD modules 110 are physically formed as a dual configuration, and logically connected to the single wire harness 160, so as to have a mutual diagnostic function. Based on the above wiring configuration of the wire harness 160, even in OFF of the main switch 101, any one of the above output elements which is adapted to indicate a failure of the BSD system 100, can be supplied with power from the ECU 200 and on/off controlled.

The mirror-reflectivity change means 150 is housed in each of the door mirrors 6, and operable to change a reflectivity of a mirror surface of the door mirror 12 in response to the antiglare switch 23. As a specific technique usable in the mirror-reflectivity change means 150 to change a reflectivity of a mirror surface of the door mirror 12, there has been known a technique of applying a certain voltage to an electro chromic (EC) element formed on a mirror surface to change in color or change the level of color development. Alternatively, any other suitable conventional technique, for example, a technique of forming on a mirror surface a shutter using a liquid crystal-based element with a crystal orientation changeable depending on voltage values applied thereto, and applying a certain voltage to the shutter to change a reflectivity of the mirror surface, may be used.

Preferably, when the door mirror has a failure indication in response to detection of a certain failure, the above antiglare function in the door mirrors is forcedly activated in such a manner as to reduce the reflectivity (increase the antiglare effect) at a higher degree or rate than that in a normal operation for the antiglare effect. Specifically, when the door mirror has no failure indication, the mirror-reflectivity changing means 150 is operable, in response to turning on the antiglare switch 23, to reduce the reflectivity by about 20 to 30%. In contrast, when the door mirror has a failure indication, the right mirror-reflectivity changing means 150 is forcibly activates to reduce the reflectivity up to about 50%, irrespective of ON/OFF states of the antiglare switch 23. This makes it possible to prevent the warning of failure from being indicated in poor visibility, even if a strong light, such as headlights from a following vehicle OV, is reflected on the mirror surface.

Figure 4:
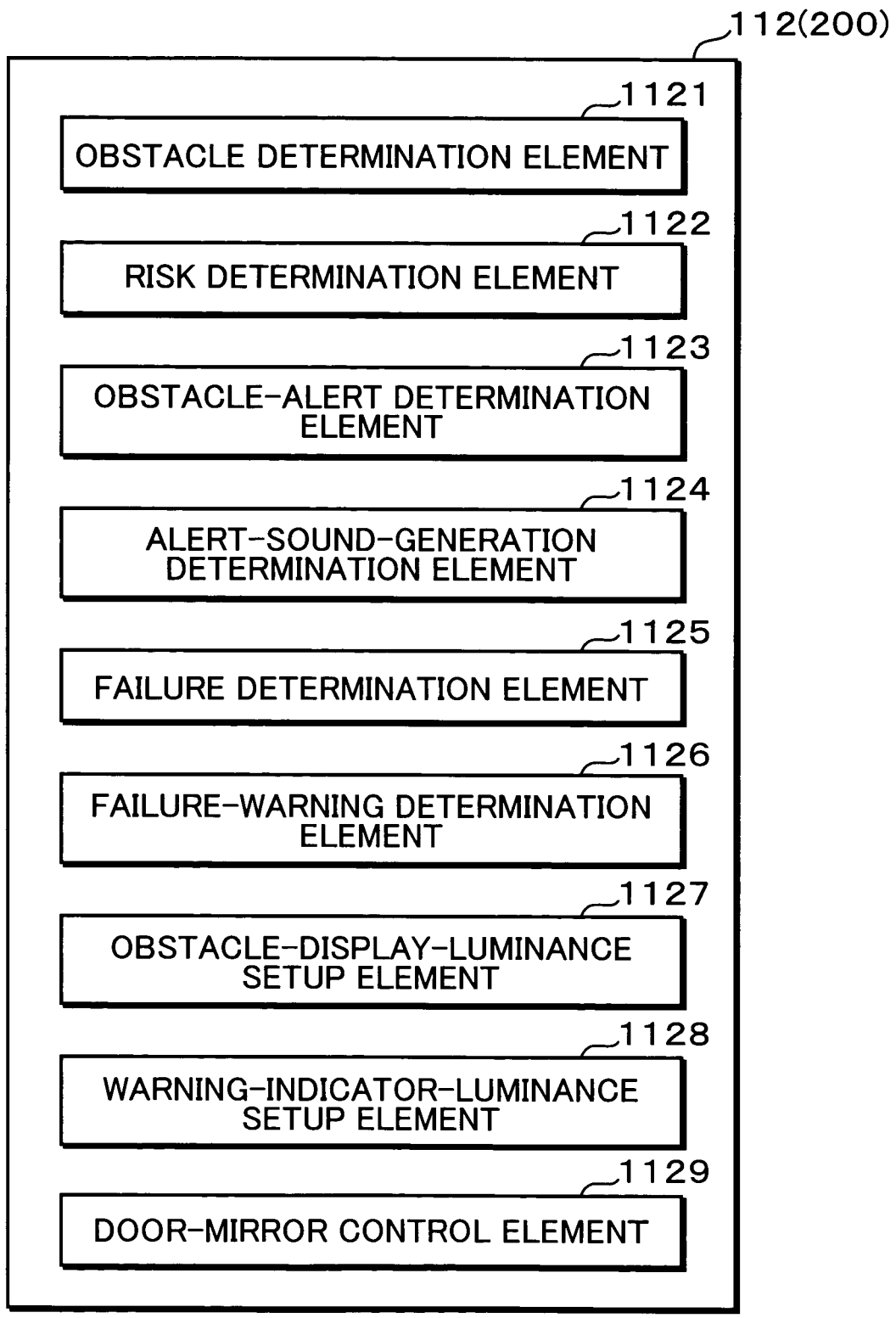
FIG. 4 is a block diagram showing a functional configuration of the BSD system.

Referring to FIG. 4, the BSD control units 112 and the engine ECU 200 are operable to serve as an obstacle determination element 1121, a risk determination element 1122, an obstacle-alert determination element 1123, an alert-sound-generation determination element 1124, a failure determination element 1125, a failure-warning determination element 1126, an obstacle-display-luminance setup element 1127, a warning-indicator-luminance setup element 1128, and a door-mirror control element 1129. The BSD system 100 is designed to allow each of the BSD control units 112 and the engine ECU 200 to serve as these elements 1121 to 1129 independently, and allow respective data of the BSD control units 112 and the engine ECU 200 to be simultaneously updated in a course of their control without contradiction therebetween, according to a convention function of data coherence.

The obstacle determination element 1121 serves as means to analytically compare between signals from the BS radars 114 (raw data) and background data so as to determine whether or not an obstacle exists in each of two blind spots SL and SR around the rear corners of the vehicle SV, and, if any, specify a type of the determined obstacle, such as another vehicle, a person or a guardrail.

The risk determination element 1122 serves as means to calculate a relative speed of the obstacle OV to the vehicle SV, based on a distance between the obstacle OV to the vehicle SV, so as to determine whether or not the obstacle is getting closer to or away from the vehicle SV, and, if it is determined that the obstacle is getting closer the vehicle SV, define the obstacle as a risky object.

The obstacle-alert determination element 1123 serves as means to determine whether or not the obstacle OV is to be displayed so as to alert the passenger to the obstacle. Specifically, in case the obstacle is determined as a risky object by risk determination element 1122, the obstacle-alert determination element 1123 is operable to control the display 121 and the in-mirror obstacle display unit 141 in response to a driver's manual operation of the turn-indicator lever 8 or the steering wheel 1 intending to turn the vehicle in a direction toward the object (in a rightward direction in this case). The obstacle-alert determination element 1123 further serves as means to determine whether or not a given condition (e.g. a speed of the vehicle VS is equal to or greater than 10 Km/h) for displaying the obstacle is satisfied, and if it is determined that the given condition is not satisfied, control the display 121 and the in-mirror obstacle display unit 141 to keep the obstacle from being displayed thereon.

The alert-sound-generation determination element 1124 serves as means to determine whether or not the sound device SD is to be driven so as to alert the driver. Specifically, the alert-sound-generation determination element 1124 is operable to control the sound device to generate an alert sound to alert the driver, under approximately the same condition as that in the obstacle-alert determination element 1123.

The failure determination element 1125 has several functions: to detect failure if at least either one of the BSD modules 110 (BS radars 114, control units 112, obstacle indicator means and sub-harness 162) is in a malfunction or abnormal state; to determine whether serious or minor if the abnormality in the BSD module 110 is detected; and to set the failure flag F of the BSD module 110 to a predetermined value depending on a level of seriousness of the abnormality (failure) if the BSD module 110 is determined to be abnormal and failed.

Several techniques are available in the failure determination element 1125. Following four techniques are such examples in addition to the diagnostic technique based on the engine ECU 200.

The first technique is designed to obtain a change in difference between an actual signal (raw data) from each of the BS radars and a corresponding signal pre-acquired in a normal state (background data), so as to detect abnormality in the signal output of the BS radar 114. In abnormality detected in the signal output of the BS radar 114 by the first technique, when a change in difference between the raw data and the background data is greater than a first threshold and equal to or less than a second threshold, the failure determination element 1125 will determine that a corresponding one of the BSD modules 110 has a minor abnormality. While a change in difference between the raw data and the background data is greater than the second threshold, the failure determination element 1125 will determine that the BSD module 110 has a serious abnormality. Specifically, from a practical standpoint, a situation where the intensity of a reflected wave is maintained at zero for a given time will never occur. Thus, in this case, the BS radar 114 will be determined to be abnormal. Further, in cases where the modules 11 and 12 of this BSD system are accommodated in the rear bumper 4 and the surface of the rear bumper 4 is capable of reflecting a radar wave (e.g. a sticker having a metal film), the intensity of a reflected wave to be received by the radar will be kept at an excessively high value. Thus, if the intensity of a reflected wave to be received by the radar is kept at an excessively high value for a given time, the radar 114 will be determined to be abnormal.

The second technique is designed to allow the two control units 112 to be mutually monitored, based on the dual configuration of the left and right BSD modules 111R and 111L having the wire harness 160 and the sub-harness 161, so as to detect abnormality in each of the control units 112. Specifically, one of the control units 112 issues a request for simple four arithmetic operations to the other control unit 112, and if the result of the arithmetic operations has an error, the control unit 112 will determine that the other control unit 112 is abnormal.

The third technique is designed to monitor an operation of the output elements (e.g. a duration of an ON state or a time-period of generating the alert sound) by a given sensor (not shown), so as to detect a circuit disconnection in the power line including the sub-harness 162. The failure determination element 1125 determines that the circuit disconnection detected in the sub-harnesses 162 and 132 by the third technique is a serious abnormality. For example, if the duration of the ON state or a blinking state is unusually long, the output element will be determined to be abnormal.

The fourth technique is designed to allow the vehicle speed sensor 24 and a turbine speed sensor (not shown) to be mutually monitored, so as to detect abnormality in the vehicle speed sensor 24. For example, a speed value obtained from the vehicle speed sensor 24 is compared with an AT turbine speed value or a speed value calculated using a transmission gear ratio. If a difference therebetween is equal to or greater than a given value, the vehicle speed sensor 24 will be determined to be abnormal.

By selectively using one or any combination of the above techniques, the failure determination element 1125 is operable to detect various abnormal states in the BSD modules 110 (control units 112, BS radars 114, alert elements 120, and 140 or the like).

The failure-warning determination element 1126 serves as means which determines whether or not the warning means satisfies conditions for performing a warning. For example, the warning conditions include whether or not the speed of the vehicle VS is equal to or greater than 10 km/h, or whether or not the main switch 101 of the BSD system 100 turns ON. The failure-warning determination element 1126 serves as means to control the warning means to change a warning mode depending on a level of seriousness (serious or minor) of an abnormality in the BSD module 110 determined by the failure determination element 1125. Specifically, the failure-warning determination element 1126 is operable to control the in-cabin warning LEDs 122 and the in-mirror warning LEDs 142 in such as manner as to generate a warning in red color when the abnormality in the BSD module 110 is determined to be serious and to control the in-cabin warning LEDs 122 and the in-mirror warning LEDs 142 in such as manner as to generate a warning in red color when the abnormality in the BSD module 110 is determined to be minor. Further, in control of the sound device SD, it is preferable to change an output alert sound depending on a level of seriousness of the abnormality. This allows the passenger of the vehicle SV to readily recognize a direction of the detected obstacle.

The obstacle-display-luminance setup element 1127 serves as means to set a luminance of an element adapted to optically output an obstacle indicator, depending on a detection result obtained in the night detection sensor 26.

The warning-indicator-luminance setup element 1128 serves as means to set a luminance of an element adapted to optically output a warning, depending on a detection result obtained in the night detection sensor 26.

The door-mirror control element 1129 serves as means to recognize each position of the left and right door mirrors 6, and controllably move the door mirror between an deploy position and a folded position.

Based on the above fundamental principle, the present invention can be implemented in various aspects. In connection with such various embodiments, the BSD system 100 of the present invention will be descried below in more derail.

First Embodiment

With a view to embodying the above BSD system 100, a pair of left and right side mirrors or door mirrors 6 arranged in a symmetric manner are employed in a first embodiment of the present invention. Therefore, the subscripts "L" and "R" indicating "left" and "right" will be omitted in the following description.

Figure 7:
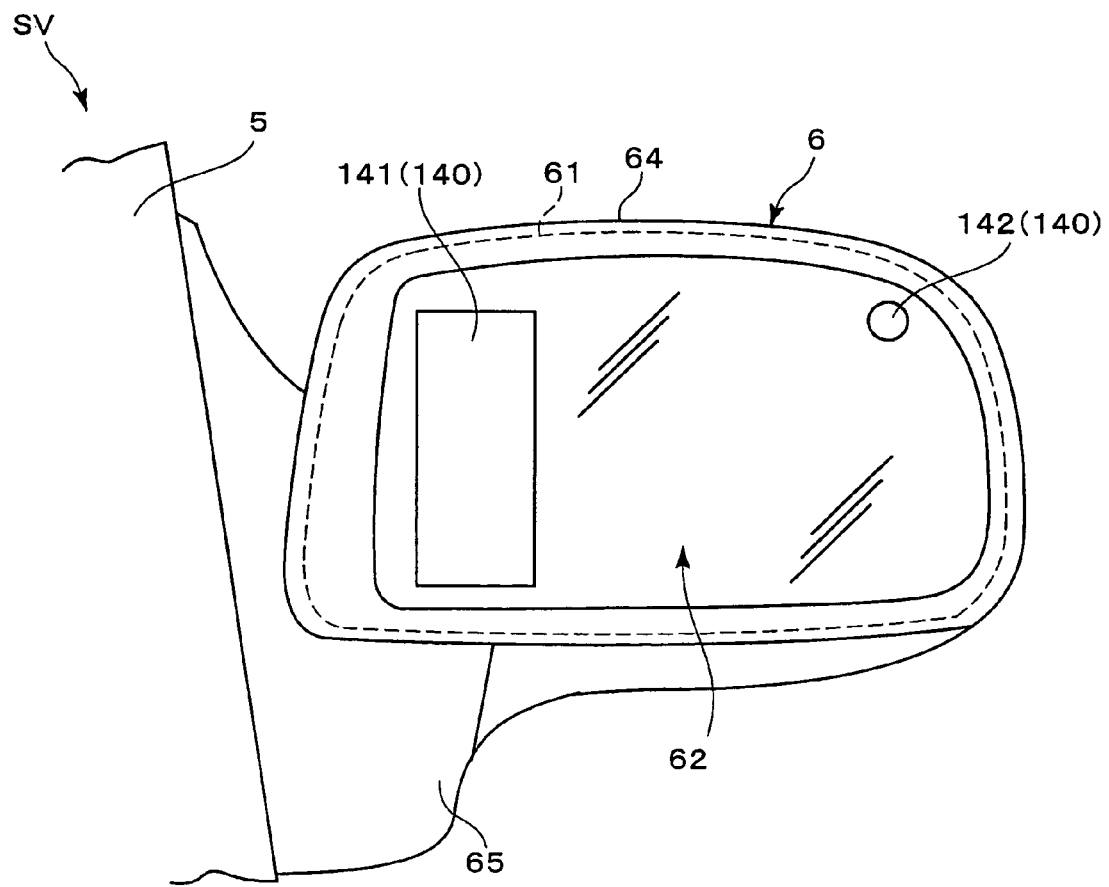
FIG. 7 is a schematic front view showing the door mirror in FIG. 6.
Figure 8:
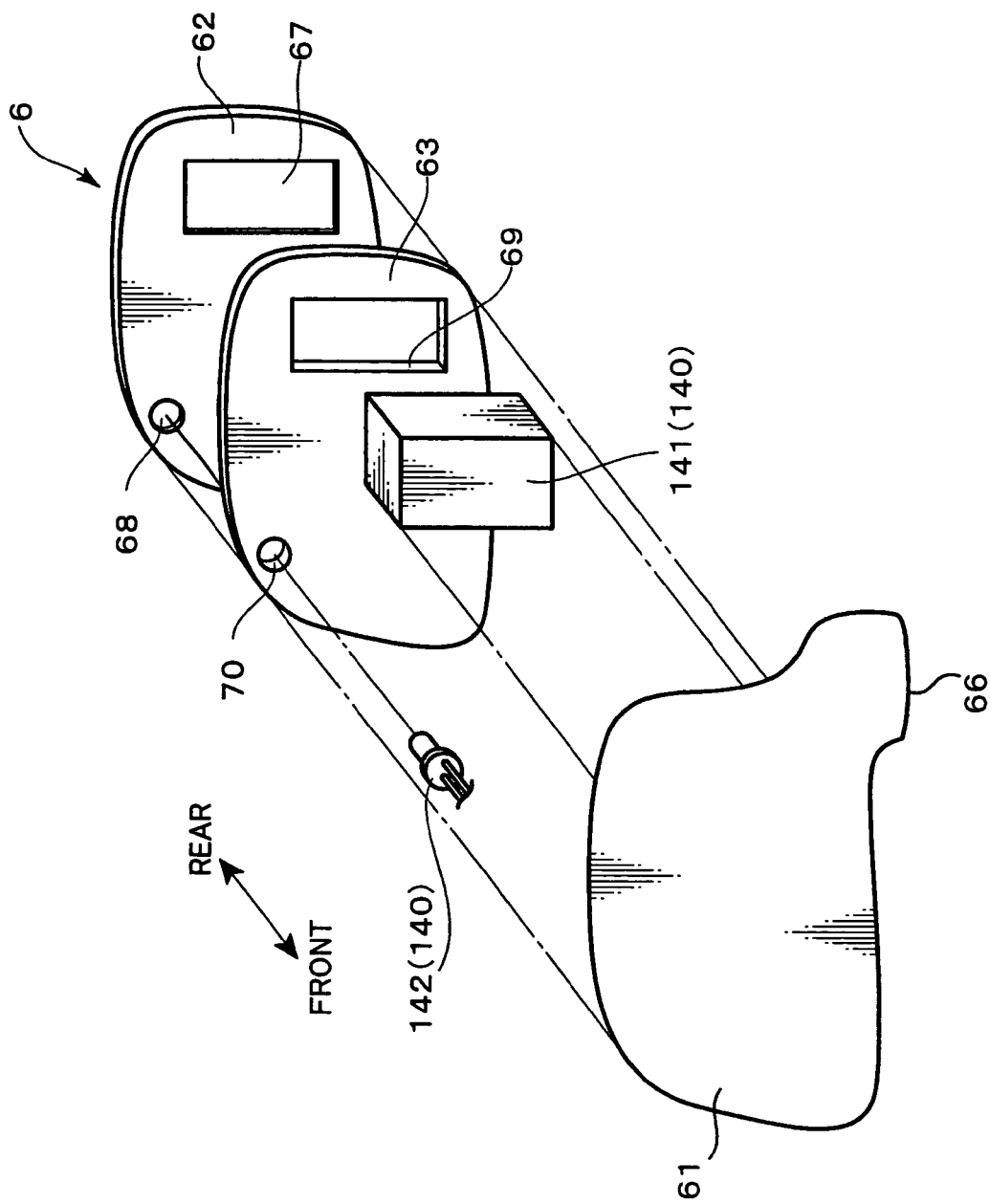
FIG. 8 is an exploded perspective view showing the door mirror in FIG. 6.

Referring to FIGS. 7 and 8, the door mirror 6 is a unit body which is provided with a frame 61 disposed on the body of the vehicle SV, a mirror glass 62 mounted on the frame 6, a heater 63 disposed on the side of a back surface of the mirror glass 62 and housed in the frame 61, and a cover 64 fixing the mirror glass 62 and the heater 63 to the frame 61.

The frame 61 is a supporting structure for the mirror glass 62 and the heater 63, and formed with an engagement portion 66 engageable with the door-mirror drive unit 7. Through this engagement portion 66, the door mirror 6 as a unit body is driven by the door-mirror drive unit 7 in such a manner as to be moved between an deploy position where the mirror glass 62 deploys to mirror the rearward direction of the vehicle SV to form a rear sight in passenger's field of view, and a folded position where the mirror glass 62 is located in opposed relation to the body of the vehicle SV. An engaged region between the engagement portion 66 and the door-mirror drive unit 7 is covered by a decorative cover 65.

The mirror glass 62 serves as a mirror surface for allowing a sight around the vehicle SV including a rearward zone relative thereto to be formed in passenger's (particularly, driver's) field of view. The mirror glass 62 is coated with the aforementioned EC element which serves as the mirror-reflectivity change means 150. The back surface of the mirror glass 62 has an indicator accommodate recess 67 and a warning accommodate recess 68 which are formed through an abrasive processing using a laser beam machine or the like. Each of the indicator accommodate recess 67 and the warning accommodate recess 68 has a bottom wall formed as a so-called half mirror structure having a given light transmittance. The indicator accommodate recess 67 is formed in a vertically-long oblong shape and at a position close to the body of the vehicle SV. The warning accommodate recess 68 is formed in a circular shape and in an upper region of the mirror glass 62 at a position far from the body of the vehicle SV.

The heater 63 is disposed on the back surface of the mirror glass 62, and composed of a planer-shaped heating element capable of generating heat for removing mist on the mirror surface. The heater 63 has an indicator opening 69 and a warning opening 70 which are formed, respectively, at positions opposed to the indicator accommodate recess 67 and the warning accommodate recess 68. The indicator opening 69 is formed in a vertically-long oblong shape, and the warning opening 70 is formed in a circular shape.

The obstacle display unit 141 and the warning LED 142 in the in-mirror alert element 140 are housed in the frame 61 of the above door mirror 60. Each of the obstacle display unit 141 and the warning LED 142 includes a LED used as a light source thereof.

Figure 9:
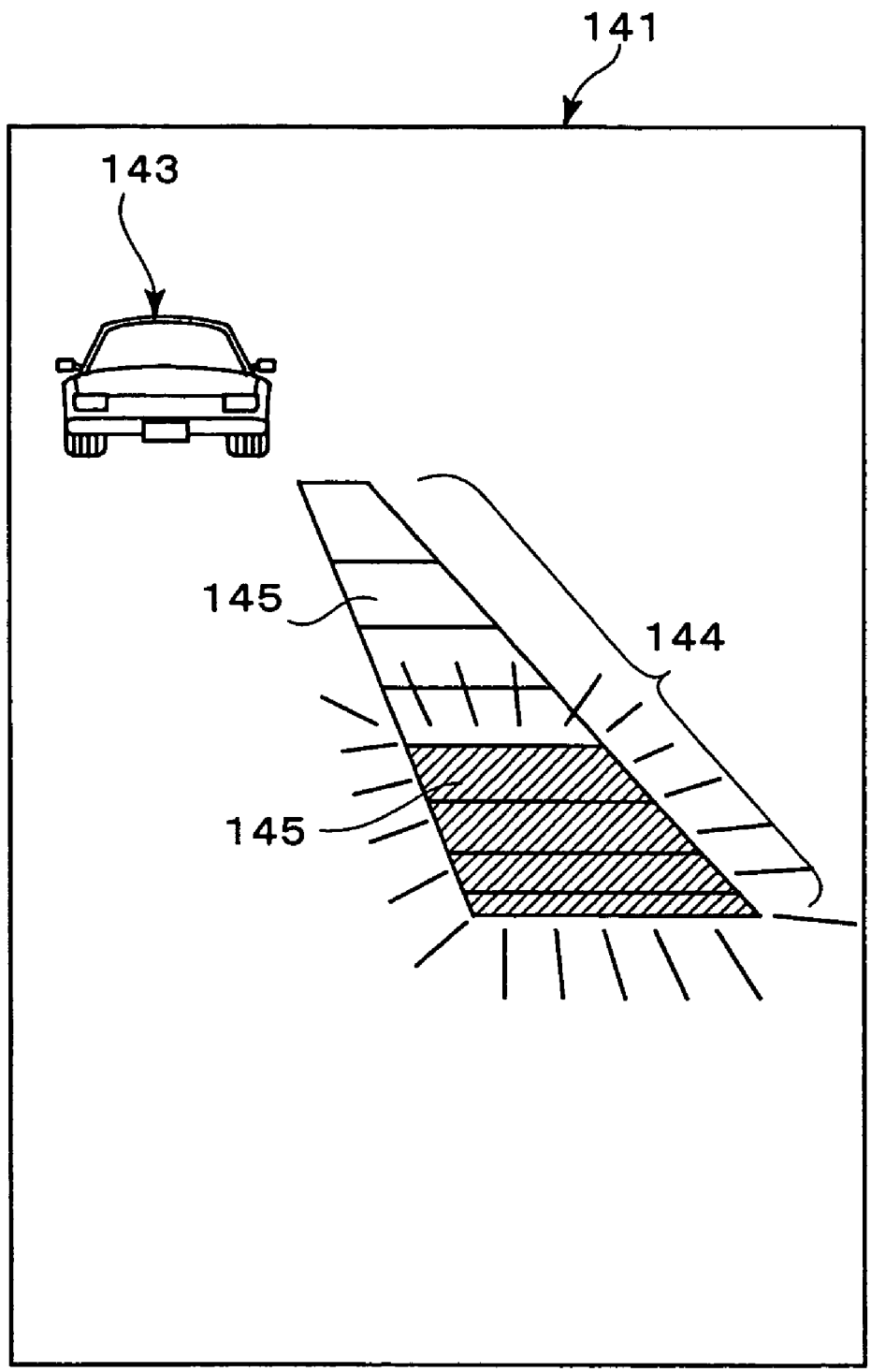
FIG. 9 is a schematic diagram of an in-mirror obstacle display unit of the BSD system according to the first embodiment.

The obstacle display unit 141 is disposed at a position corresponding to the indicator opening 69 of the heater 63, and provided with a plurality of LEDs and an LED front glass. Each of the LEDs used in the obstacle display unit 141 is adapted to emit a plurality of lights different in wavelength so as to be lighted/blinked in orange and red colors. As shown in FIG. 9, in the same manner as that of the right half of the icons 123 to 125 in FIG. 3, image symbols 143 to 145 are depicted on the LED front glass. These image symbols 143 to 145 are depicted in such a manner as to be on the mirror glass 62 so as to show an obstacle existed in a rearward (right in this embodiment) zone relative to the vehicle SV. As with the display 121, the obstacle display unit 141 may be composed of a liquid-crystal display unit.

The warning LED 142 is disposed at a position corresponding to the warning opening 70 of the heater 63. The warning LED 142 is adapted to emit a plurality of lights different in wavelength so as to be lighted in red and yellow colors, and designed such that the intensity of light to be emitted therefrom can be adjusted to change in luminance.

As above, in the in-mirror alert element 140, light from the obstacle display unit 141 is emitted onto the indicator accommodate recess 67 of the mirror glass 62, and projected onto the mirror glass 62. Light from the warning LED 142 is emitted onto the warning accommodate recess 68 of the mirror glass 62, and projected onto the mirror glass 62. The image symbol of the obstacle display image 141 may be an icon associated with a GUI and to be displayed on a liquid-crystal display panel embedded in the mirror glass 62. An indication using the in-mirror warning LED 142 is not limited to the image symbol projected onto the mirror glass 62. For example, the warning accommodate recess 68 of the mirror glass 62 may be substituted with a through-hole, and the warning LED 142 may be exposed from the mirror surface to provide the indication directly by itself. In this case, a light-emitting member other than the LED, such as a light bulb, may be used. This type of light-emitting member may be exposed outside at a suitable position located in a gap region between the mirror glass 62 and the cover 64, an outer surface of the cover 64, or the decorative cover 64 fixed to the body of the vehicle SV be as well as the mirror glass 62. As shown in FIG. 5, a following vehicle is less likely to be reflected on a right corner in the right mirror glass 62R of the right door mirror 6R, or a left corner in the left mirror glass 62L of the left door mirror 6L, where the in-mirror warning LED 142 is disposed. Thus, the warning can be adequately performed without spoiling an original function of the door mirror 6 or a function of mirroring a following vehicle The cover 64 is a conventional member provided as means to protect the mirror glass 62, the heater 63, the obstacle display unit 141, and the warning LED 142 from external shock.

The decorative cover 65 is an exterior component fixed to the front door 5.

In the first embodiment, the display 123 in a passenger compartment (in-cabin display) and the obstacle display unit 141 in the door mirror 6 (in-door obstacle display unit) serve as a substantial part of obstacle indicator means in the present invention. The in-cabin warning LED 122 mounted on the instrument panel 2 and the in-mirror warning LED 142 serve as a substantial part of warning means in the present invention. When viewed from the driver of the vehicle SV, the in-mirror worming LED 142 is designed to be located in approximately the same direction (on the right side of the vehicle SV in this embodiment) as that toward a position where the obstacle display unit 141 is located.

Figure 10:
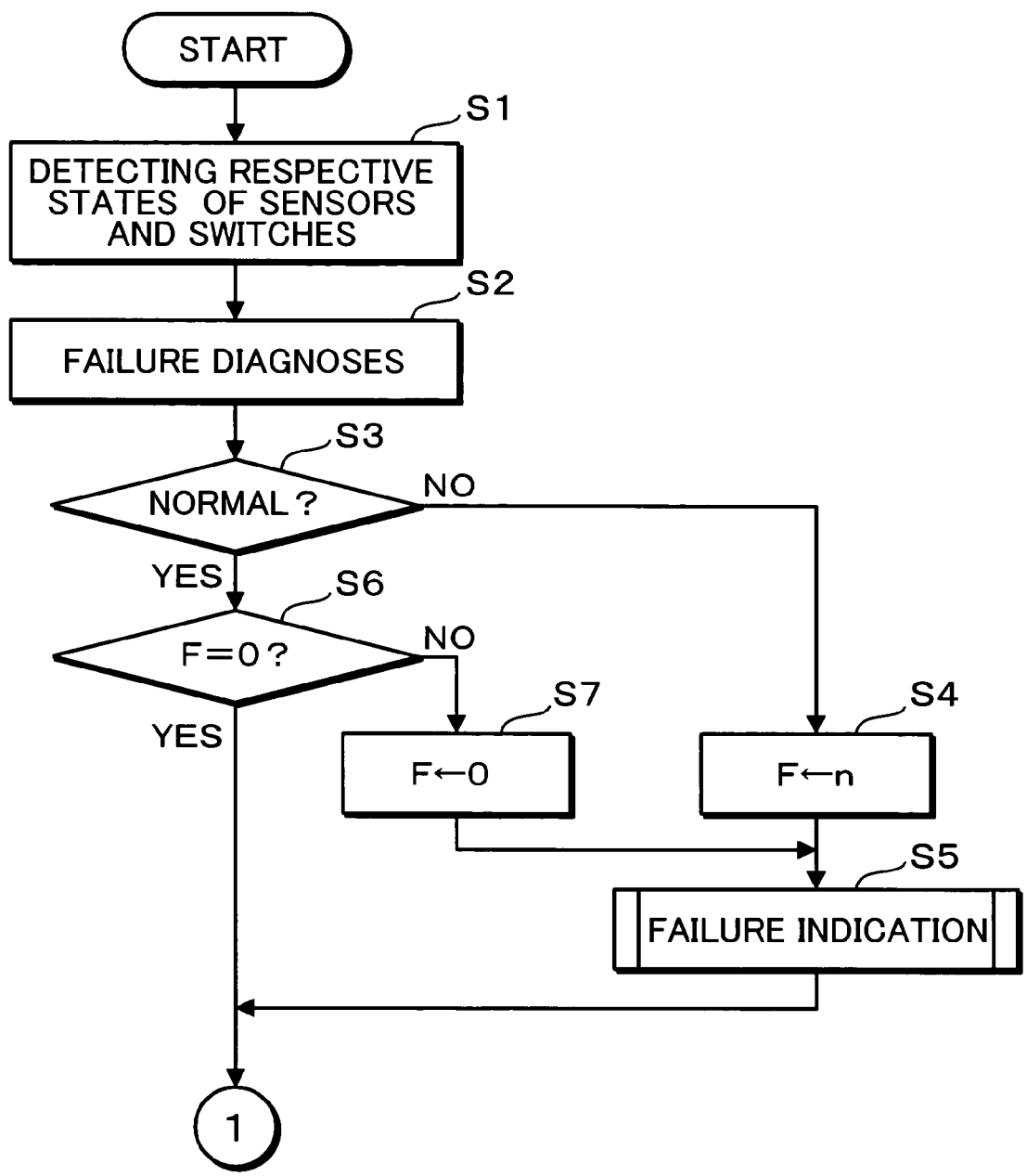
FIGS. 10 to 14 are flowcharts showing an alert process in the BSD system according to the first embodiment of the present invention.
Figure 11:
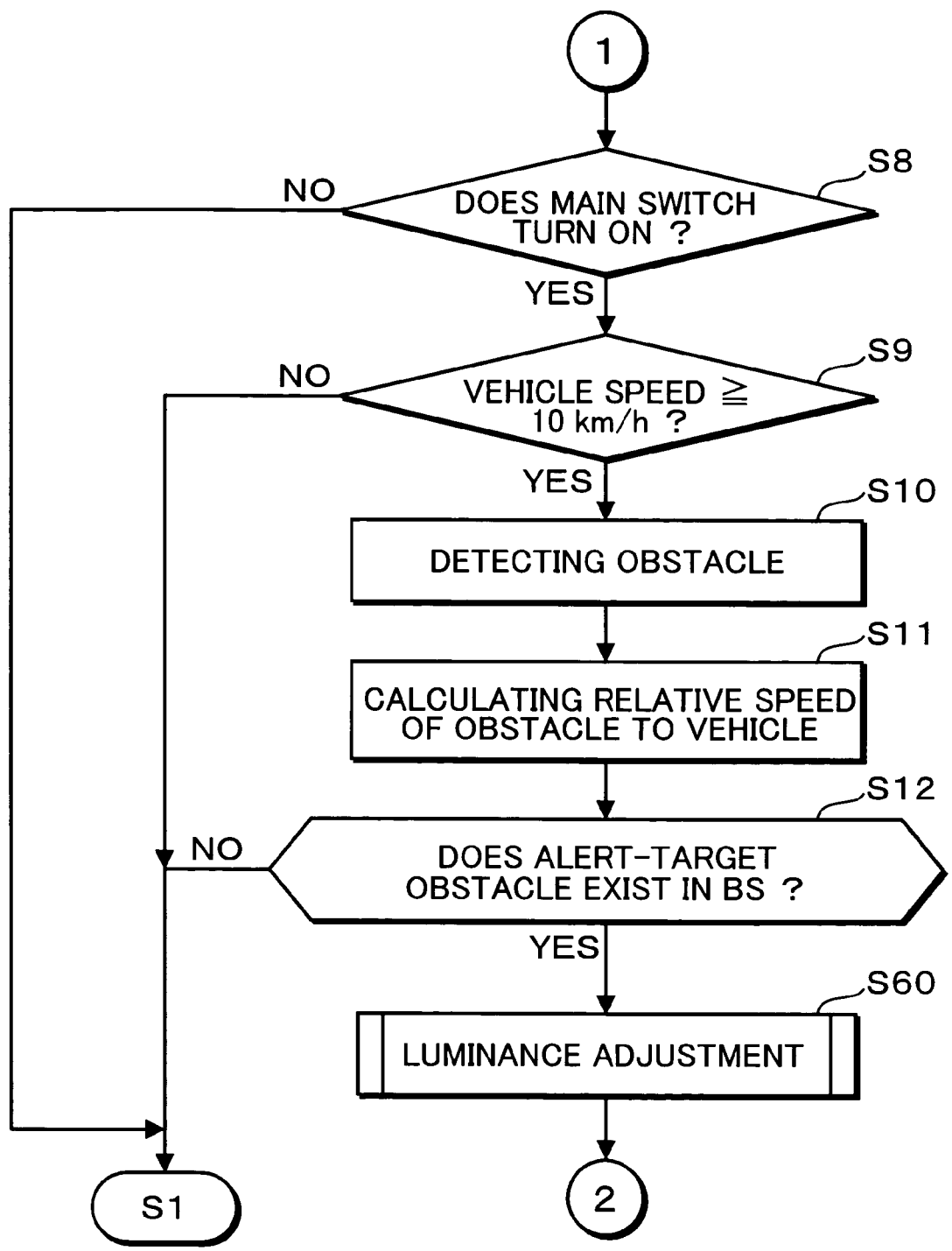
Figure 12:
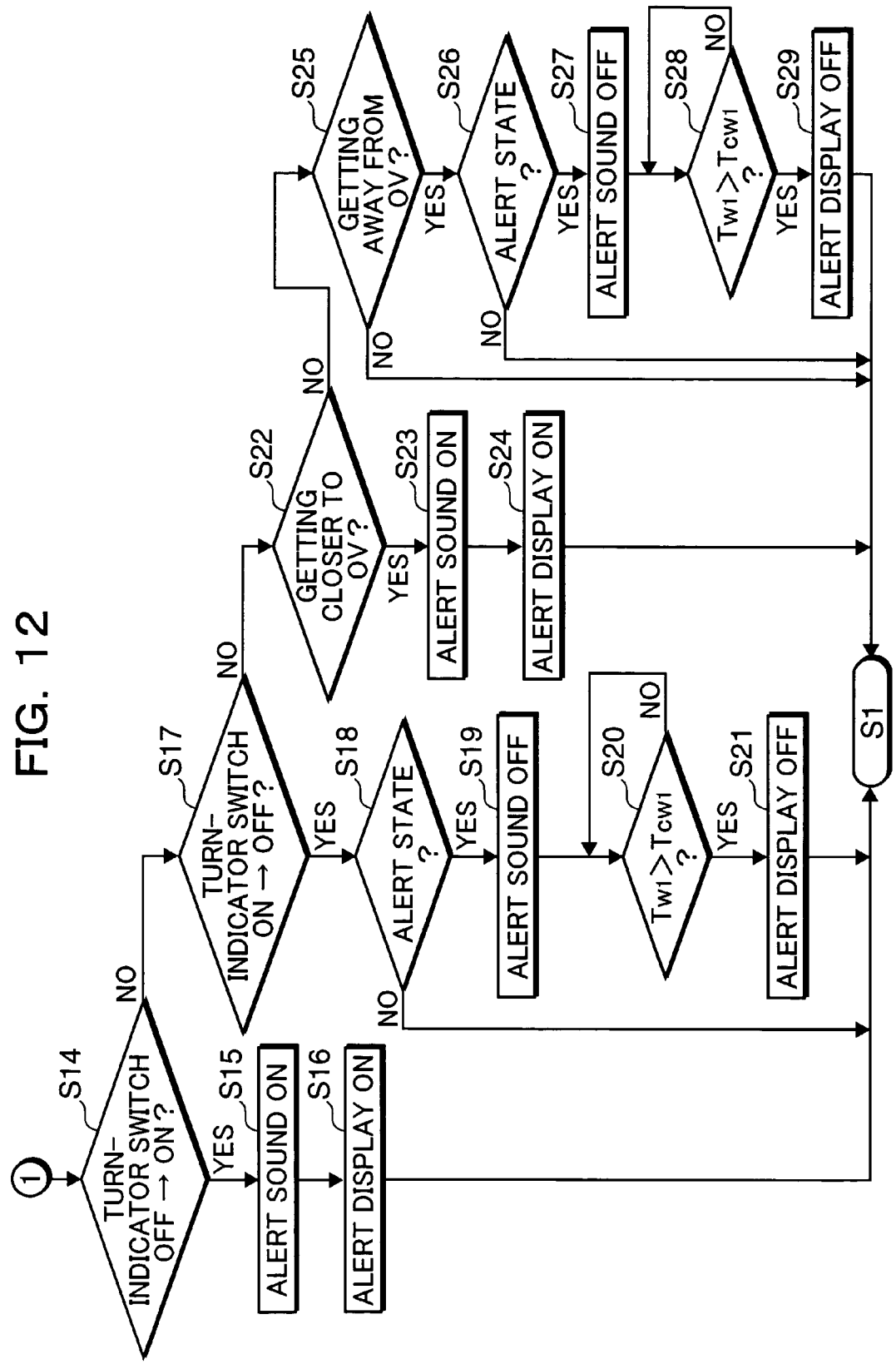

With reference to FIGS. 10 to 12, the obstacle alert function in one of the control units 112 will be described.

Firstly, in response to turning on the ignition switch 21 of the vehicle SV, the engine ECU 200 connected to the wire harness 160 detects respective states of the sensors and switches (Step S1). Then, the ECU 200 executes the aforementioned failure diagnosis based on signals entered therein (Step S2), to determine whether or not the BSD system is normal (Step S3). If a certain failure is detected as the result of the failure diagnoses ("NO" in Step S3), the failure flag F is updated to a value "n" corresponding to the detected failure mode (Step S4). Specifically, when the failure determination element 1125 determines that the BSD module 110 has a serious abnormality or a minor abnormality, the failure flag F will be set to a value representing the serious abnormality or the minor abnormality, in conformity to the determination.

Then, an after-mentioned failure indication subroutine is executed (Step S5).

When no abnormality is detected, a failure flag F stored on the failure-flag storage area 201 is referred to (Step S6). If the failure flag F has a value representing a failure state, it is updated to the value "0" (Step S7), and the after-mentioned failure display subroutine S5 is executed. If the failure flag F has the value "0", the process will advance directly to subsequent steps. After the main switch 101 is turned ON to activate the BSD modules 110, the above operations in Steps S1 to S7 are performed in the respective control units 112 of the BSD modules 110 while sharing common data therebetween based on the conventional dual configuration thereof. That is, the BSD modules 110 are configured such that one of the BSD modules can make the failure diagnosis for the other BSD module mutually, and a failure occurring in one of the BSD modules can be indicated in the alert element connected to the other BSD module.

Referring to FIG. 11, if the main switch 101 turns OFF ("NO" in Step S8), the process returns to Steps S1. When the main switch 101 turns ON ("YES" in Step S8), each of the BSD modules 110 is activated to determine whether speed of the vehicle VS is equal to or greater than 10 km/h, based on a detection signal from the vehicle speed sensor 22 (Step S9). If it is determined that the speed of the vehicle SV is less than 10 km/h, the process in the control units 110 will return to Step S1 without displaying an obstacle. When it is determined that the speed of the vehicle SV is equal to or greater than 10 km/h, the obstacle determination element 1121 performs a determination about whether or not an obstacle exists in a detection area of a corresponding one of the blind spots SL and SR around the vehicle SV, based on respective detection signals from the BS radars 114 (Step S10). Then, the risk determination element 1122 calculates a relative speed of the obstacle to the vehicle SV (Step S11). This makes it possible to determine whether the obstacle in the corresponding blind spot SL or SR is getting closer to or away from the vehicle SV, and to define the obstacle getting closer to the vehicle SV, as a risky object to be alerted (or alert-target obstacle).

Then, it is determined whether or not an alert-target obstacle OV exists in the corresponding blind spot SL or SR around the vehicle SV (Step S12). If the determination in Step S12 is "NO" or it is determined that no alert-target obstacle OV exists in the corresponding blind spot SL or SR around the vehicle SV, the process in the control unit 11 will return to Step S1 without displaying an obstacle and generating an alert sound. While it is determined that an alert-target obstacle OV exists in the corresponding blind spot SL or SR around the vehicle SV, an after-mentioned luminance adjustment subroutine S60 is executed, and then the process advances to subsequent steps.

Referring to FIG. 12, after completion of the luminance adjustment subroutine S60, it is determined whether or not the turn-indicator switch 10 is turns from OFF to ON so as to change the turn indicators from OFF to blinking state (Step S14).

When it is determined that the turn-indicator switch 10 is changed from OFF to ON, the alert-sound generation element 1124 controls the sound device SD to generate an alert sound from a speaker thereof (Step S15), and the obstacle-alert determination element 1123 controls the in-cabin alert element 120 and the in-mirror alert element 140 to display the obstacle on the display 121 in the instrument panel 2 and the mirror glass 62 in the door mirror 6, at an luminance set by luminance setup means (Step S16). These operations in Steps S15 and S16 may be concurrently performed.

If the determination in Step S14 is "NO" or it is determined that the turn-indicator switch 10 is OFF, the control unit determines whether or not the turn-indicator switch 10 turns from ON to OFF in order to change the turn indicators OFF the blinking state (Step S17). When it is determined that the turn-indicator switch 10 is OFF, it is determined whether or not the obstacle indicator means, such as the display 121 and the in-mirror display unit 141, is in an alert state (Step S18).

If the determination in Step S18 is "NO" or it is determined that the obstacle indicator means is not in an alert state, the process in the control unit 11 will return to Step 1 without displaying an obstacle and generating an alert sound. While it is determined that the obstacle indicator means is in an alert state, the alert-sound generation determination element 1124 controls the sound device SD to stop generating an alert sound from the speaker (Step S19). Then, it is determined whether or not an elapsed time $T_{W1}$ from stop of the alert sound has exceeded a given time $T_{CW1}$ (Step S20).

If the determination in Step S20 is "NO" or it is determined that the elapsed time $T_{W1}$ has not exceeded the given time $T_{CW1}$ yet, the process will return to Step 20. Then, when it is determined that the elapsed time $T_{W1}$ has exceeded the given time $T_{CW1}$, the obstacle-alert determination element 1123 turns OFF the display 121 in the instrument panel 2 and the in-mirror obstacle display unit 141 (Step S21). In this manner, the display of the obstacle is discontinued after the given time has elapsed from the stop of the alert sound. Thus, the obstacle can be displayed only for a time required for alerting the driver of the vehicle SV to the obstacle so as to ensure vehicle safety-driving while reducing vehicle passenger's bothersome feeling.

If the determination in Step S17 is "NO" or it is determined that the turn-indicator switch 10 is ON, it is determined whether or not the steering wheel is operated to turn the vehicle in a direction getting closer to the obstacle OV, based on a detection signal from the steering angle sensor 23 (Step S22). When the determination in Step S22 is "YES" or it is determined that the steering wheel is operated to turn the vehicle in a direction getting closer to the obstacle OV, the same operations as those in Steps S15 and S16 are sequentially performed to activate the sound device SD to generate an alert sound, and to activate the display 121 and the obstacle display unit 141 of the in-mirror alert element 140 to display the obstacle (Steps S23 and S24).

If the determination in Step S22 is "NO" or it is determined that the steering wheel is not operated to turn the vehicle in a direction getting closer to the obstacle OV, it is determined whether or not the steering wheel is operated to turn the vehicle in a direction getting away from the obstacle OV, based on a detection signal from the steering angle sensor 23 (Step S25). If the determination in Step S25 is "NO" or it is determined that the steering wheel is not operated to turn the vehicle in a direction getting away from the obstacle OV, the process in the control unit 11 will return to Step 1 without displaying an obstacle and generating an alert sound.

When the determination in Step S25 is "YES" or it is determined that the steering wheel is operated to turn the vehicle in a direction getting away from the obstacle OV, it is determined whether or not the obstacle indicator means is in the alert state (Step S26). If the determination in Step S26 is "NO" or it is determined that the obstacle indicator means is not in the alert state, the process will return to Step S1 without displaying the obstacle. When the determination in Step S26 is "YES" or it is determined that the obstacle indicator means is in the alert state, the same operations as those in Steps S18 to S21 are sequentially performed to turn OFF the sound device SD, the display 121, and the obstacle display unit 141 of the in-mirror alert element 140 to display the obstacle (Steps S27, S28 and S29).

In the above way, the control unit 112 controls the obstacle indicator means.

Figure 13:
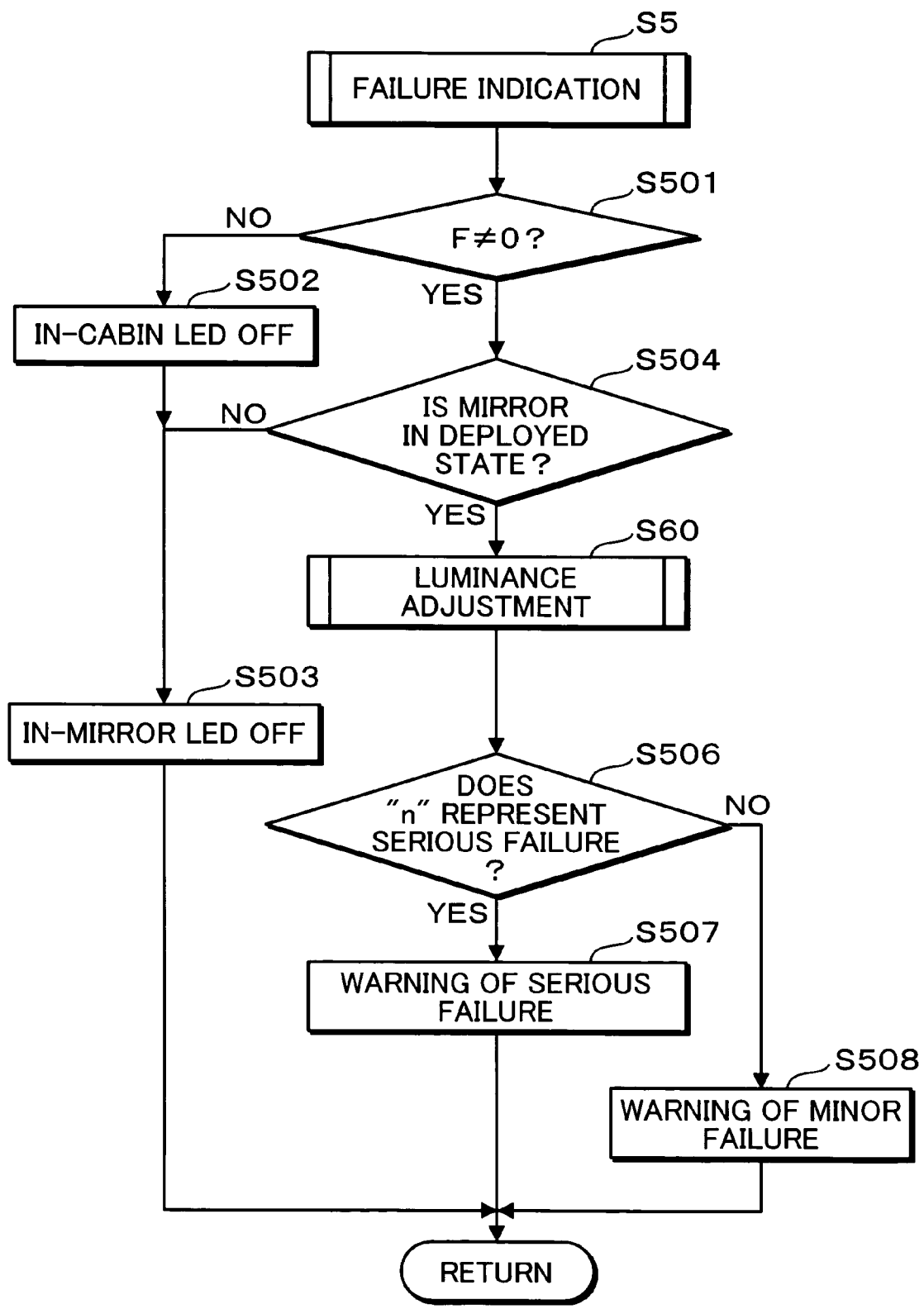

With reference to FIG. 13, the failure indication subroutine (FIG. 10) S5 will be described below.

As shown in FIG. 13, in response to execution of the failure indication subroutine, the failure determination element 1125 reads the failure flag F stored on the failure-flag storage area 201 to determine whether or not a failure has occurred (Step S501). If the value of the failure flag F is "0" ("NO" in Step S501), the failure-warning determination element 1126 turns off the in-cabin warning LED 122 in the in-cabin alert element 120 (Step S502), and further turns off the in-mirror warning LED 142 in the in-mirror alert element 120. Then, the process returns to the main routine.

When the failure flag F has a value representing a certain failure, the door mirror control element 1129 determines whether or not the door mirror 6 is in the deployed position (Step S504). When the door mirror 6 is in the folded position, the process advances to Step S503 to turn off the in-mirror warning LED 142 by the failure-warning determination element 1126, and the process returns to the main routine. If the door mirror 6 is in the deployed position, an after-mentioned luminance adjustment subroutine S60 will be executed. Then, the failure determination element 125 determines a level of the failure based on the value of the failure flag F (Step S506).

Based on the determination of the failure determination element 1125, the failure-warning determination element 1126 controls the in-cabin warning LED 122 and the in-mirror warning LED 142 in the respective alert elements 120 and 140 in such a manner as to warn of the failure (Steps S507 and S508). This failure warning may be performed in various manners. For example, a warning mode may be changed depending on the level of the failure to inform the passenger of the failure level. Specifically, each of the warning LEDs 122 and 142 may be controlled to emit red light and yellow light, respectively, in a warning of a serious failure (Step S507) and a warning of a minor failure (Step S508).

Further, when a certain abnormality is detected in either one of the BSD modules 110, only the warning LED 142 incorporated in the door mirror 6 associated with the abnormal BSD module may be turned ON.

Alternatively, when a certain abnormality is detected in either one of the BSD modules 110, the respective warning LEDs 142 incorporated in both the left and right door mirrors may be simultaneously turned ON.

Figure 14:
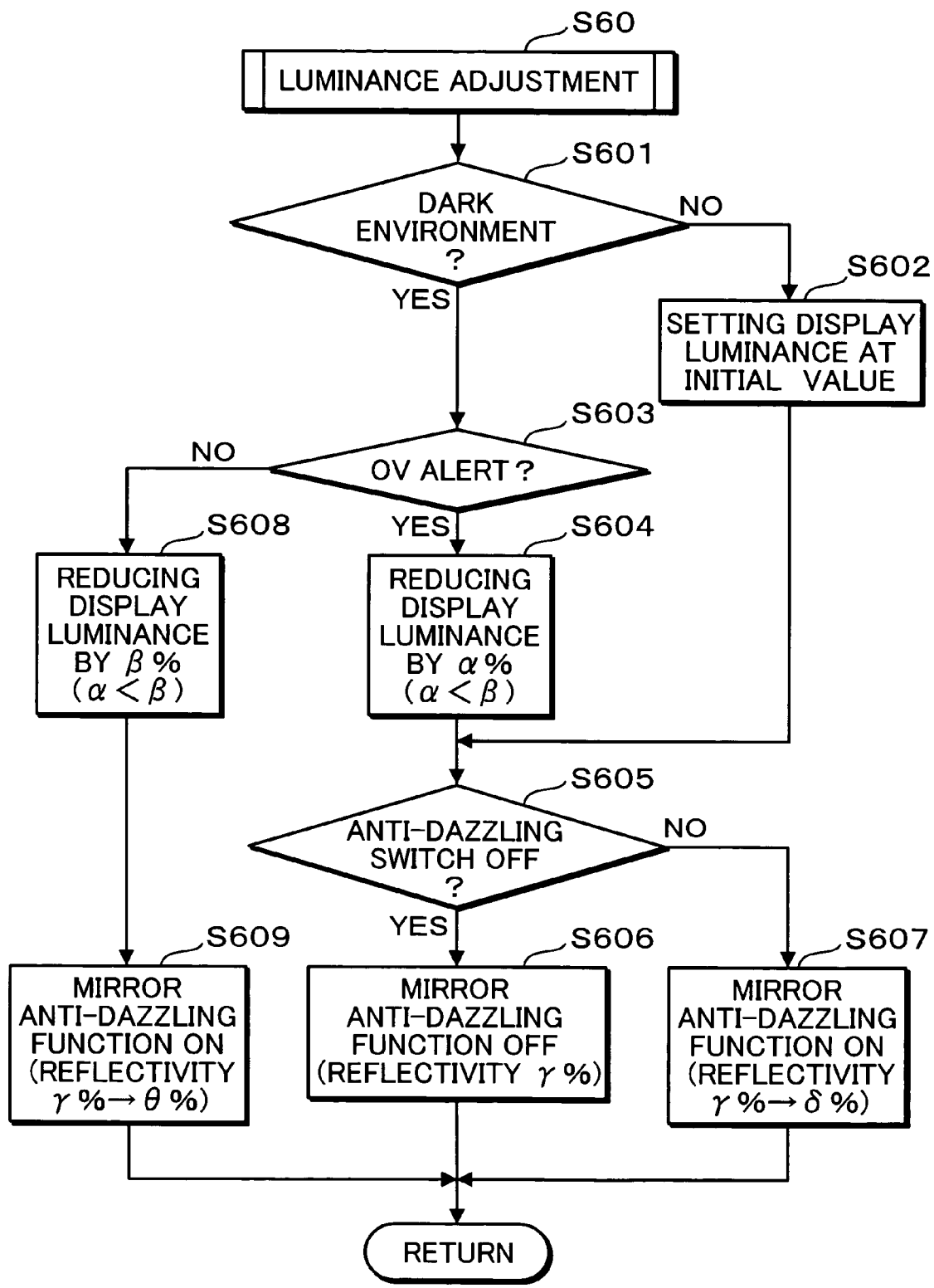

Refereeing to FIG. 14, in the luminance adjustment subroutine S60, it is determined whether or not the self vehicle SV travels in the night or similar environments (dark environments) (Step S601). If it is determined that the traveling environment is not the dark environment, such as daytime, the obstacle-display-luminance setup element 1127 will set a luminance of an alert display at an initial value (Step S602) and the process advances to Step 605. While it is determined that the self vehicle SV travels in the dark environments, such as night, a control for changing the initial value on a control target-by-control target basis is performed (Step S603). Specifically, when the control target is an obstacle symbol ("YES" in Step S603), the obstacle-display-luminance setup element 1127 lowers the luminance of the alert display from the initial value by a given rate (Alpha %) (Step S604). In this embodiment, the lowering rate (Alpha %) is set in the range of about 20% to about 30%.

Then, the obstacle-display-luminance setup element 1127 determines whether or not the passenger has turned ON the antiglare function, based on an output signal from the antiglare switch 23 (Step S605). When the antiglare switch is turned OFF, a signal for canceling the mirror antiglare function is output to the mirror-reflectivity change mean 150. As the result, the mirror reflectivity is set at an initial value of Gamma %. While the antiglare switch is turned ON, a signal for activating the mirror antiglare function is output to the mirror-reflectivity change mean 150. As the result, the mirror reflectivity is changed from the initial value of Gamma % to Delta %. In this embodiment, the reflectivity is specifically set at about 98% (Gamma) when the antiglare switch turns OFF, and at about 70% (Delta) when the antiglare switch turns ON.

Meanwhile, the control target is a failure indication ("NO" in Step S603), the warning-indication-luminance setup element 1128 lowers a luminance of the failure indication from an initial value by a given rate (Beta %) (Step S608). In this embodiment, the lowering rate (Beta) is specifically set at about 50%, which is greater than the lowering rate (Alpha: 20% to 30%) in Step S604.

Then, irrespective of the state of the antiglare switch 23, the mirror-reflectivity change means 160 is forcibly activated (Step S609). In this case, the reflectivity is lowered by a higher rate (Theta %) than that to be obtained when the passenger normally operates the antiglare switch to activate the antiglare function. Specifically, while the initial reflectivity (Delta) can be lowered to about 70% when the passenger operates the antiglare switch to activate the antiglare function, the control in Step S609 lowers the initial reflectivity to about 50% (Theta). Then, a signal for lighting the failure indication at the setup luminance is output to the in-mirror warning LED 142, and then the process is terminated.

As described above, according to this embodiment, both an obstacle information on the rear side of the vehicle and warning information of a failure in the BSD system 100 are indicated on the mirror surface of the same door mirror. Thus, even during driving, a passenger can perceive the occurrence of the failure in the BSD system 100 readily and reliably by less movement of the visual line. In addition, as to the obstacle alert and failure indications, the luminance lowering rate and the reflectivity lowering rate under detection of a failure can be adequately set to reduce passenger's bothersome feeling due to the failure indication in the dark environment, such as night, while preventing the failure indication from hindering a rearward visibility based on the door mirror.

In the first embodiment, the in-mirror obstacle display unit 141 and the warning LED 142 are incorporated in the door mirror 6. That is, the in-mirror warning LED 142 is disposed in the field of view of a passenger who is looking at the in-mirror obstacle display unit 141. Thus, when the passenger (particularly, driver) of the vehicle SV visually checks the in-mirror obstacle display unit 141, the in-mirror warning LED 142 can be visually recognized simultaneously. This allows the passenger to reliably perceive a failure of the BSD module 111 during use of module 111.

Further, the in-mirror warning LED 142 is mounted on the door mirror 6 having neither warning lamps nor meters except for the in-mirror warning LED 142. This makes it possible to facilitate visually checking the in-mirror warning LED 142 so as to allow the passenger to perceive a failure of the BSD module 111 readily and quickly based on the in-mirror warning LED 142.

In the first embodiment, the pair of left and right BSD modules 111 are designed to detect a failure independently, and the in-mirror warning LED 142 is mounted on each of the left and right door mirrors 6. Thus, a failure occurring in each of the left and right BSD modules 111 can be figured out by the in-mirror warning LED 142 mounted on a corresponding one of the left and right door mirrors 6. This allows the passenger to accurately perceive a failed one of the left and right BSD modules 111 during use of the BSD modules 111.

As described above, in the first embodiment, on the condition that the door mirrors 6 of the vehicle SV are in the deployed state, the in-mirror warning LEDs 142R and 142L indicate a failure in the BSD modules 111. Thus, a failure in the BSD modules 111 can be indicated when the door mirrors 6 are in the deployed state or the BSD modules 111 are highly likely to be used by the driver, and the failure indication can be avoided when the door mirrors 6 are in the folded state or the BSD modules 111 are less likely to be used by the driver. This makes to possible to prevent an unnecessary indication of the in-mirror warning LEDs 142R and 142L so as to reduce a bothersome feeling in the passenger of the vehicle SV.

While a specific luminance lowering rate and a specific reflectivity lowering rate under detection of a failure (abnormal state), in the night or similar environment, is described in the above embodiment, these specific values are shown by way of example only, and may be appropriately changed depending on the types, markets (countries or locations) of target vehicles. Further, the BSD system may be designed to allow the above values to be changed stepwise depending on passenger's preference or traveling environments.

Second Embodiment

Figure 15:
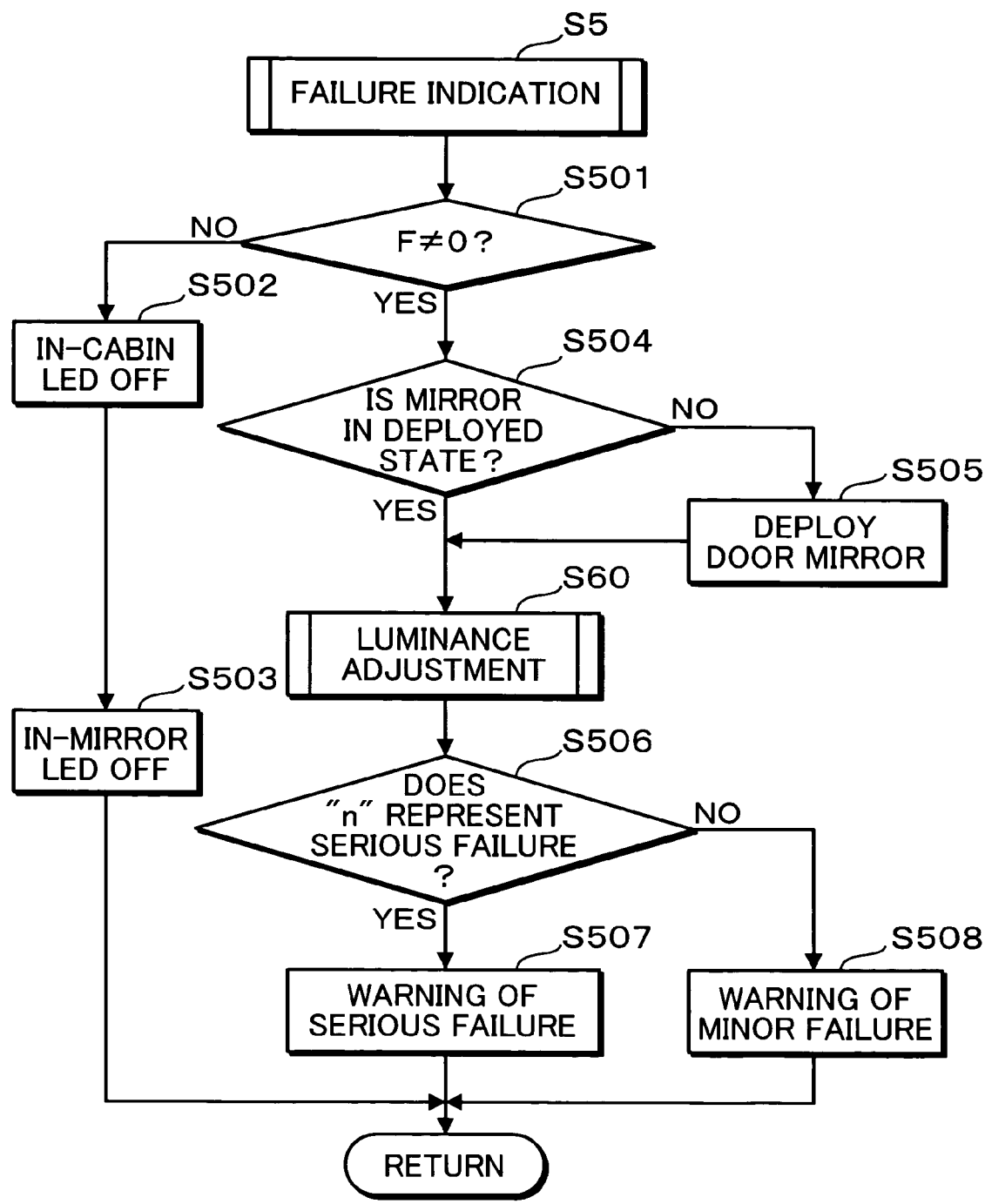
FIG. 15 is a flowchart showing a failure indication subroutine in a BSD system according to a second embodiment of the present invention.

As shown in FIG. 15, in a BSD system according to a second embodiment of the present invention, when it is determined that the left and right door mirrors 6 are not in the deployed position, based on an output of the door-mirror deploying switch 22 ("NO" in Step S504), the door mirror control element 1129 controls the door mirror drive unit 7 to move the door mirrors 6 to the deploy position, in Step S505. Preferably, in Step 505 illustrated in FIG. 15, the movements of the left and right door mirrors 6 to the deploy position are controllably initiated after confirming safe conditions that no obstacle exists around the vehicle SV, using a corner sensor mounted on the vehicle SV.

In the second embodiment, the door mirrors 6 are automatically deployed when the ignition switch 21 is turned ON, provided that the rearward obstacle alert system is demanded to be activated. Thus, regardless the operation of the main switch 101 of the BSD modules 110, it can be checked whether or not abnormality in the BSD modules 110 has been detected, so as to allow a passenger to perceive the occurrence of a failure in the BSD modules 110 automatically and quickly.

Third Embodiment

Figure 16:
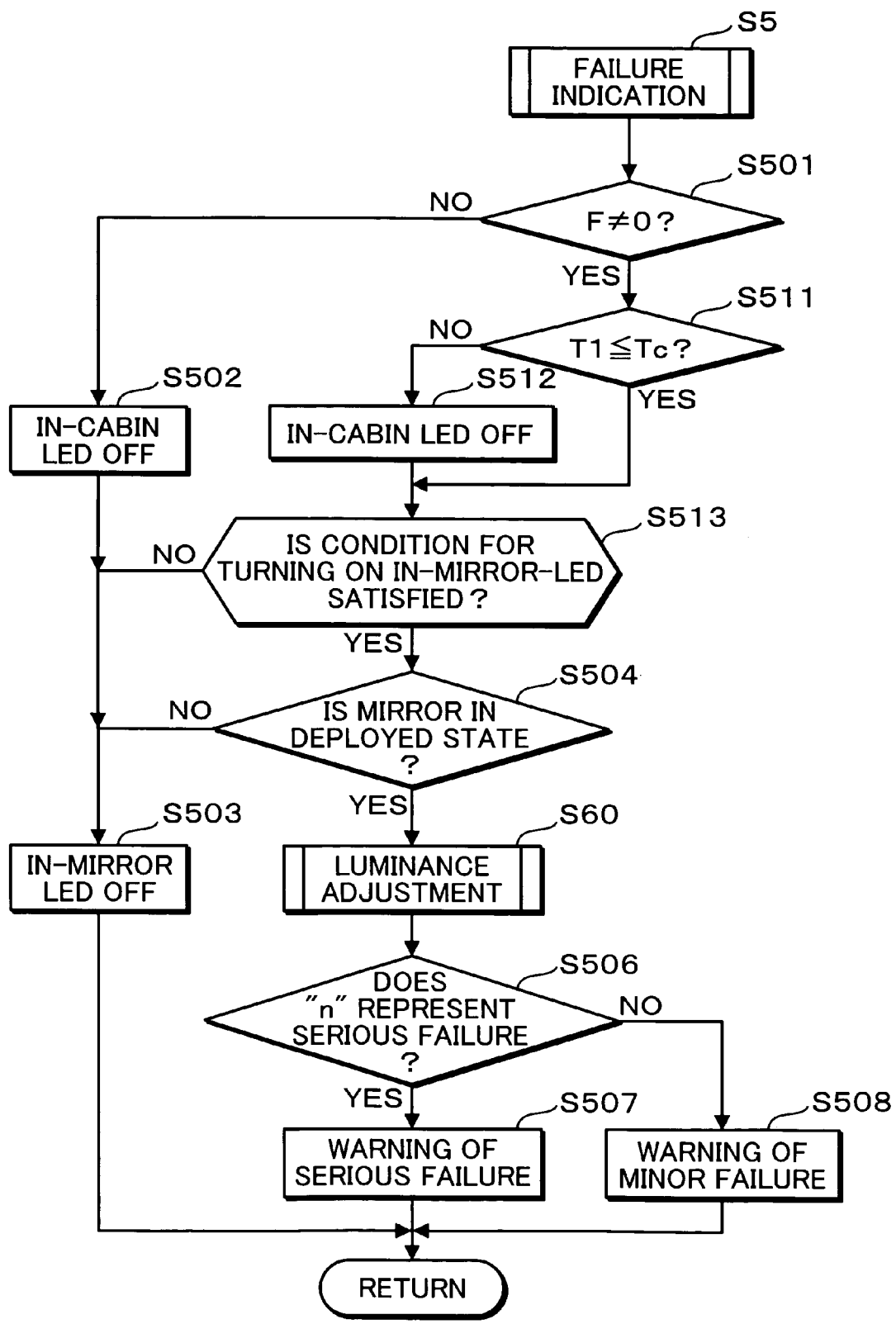
FIG. 16 is a flowchart showing a failure indication subroutine in a BSD system according to a third embodiment of the present invention.

As shown in FIG. 16, in a BSD system according to a third embodiment of the present invention, a given condition (timing condition) is set to the warning based on warning means in the failure indication subroutine S5. In this embodiment, the failure-warning determination element 1126 controls the in-cabin warning LED 122 to indicate a warning when an elapsed time T1 after initiation of the ON state of the ignition switch 21 falls within a given time Tc1. Further, the failure-warning determination element 1126 controls the in-mirror warning LED 142 to indicate a warning when the main switch 101 turns ON and before a given time elapses after the vehicle speed becomes equal to or greater than 10 km/h.

When the failure flag F is set at "n" through the operation in Step S4, the failure-warning determination element 1126 determines whether or not the elapsed time T1 after initiation of the ON state of the ignition switch 21 is equal to or less than the given time Tc1 (Step S511).

If the determination in Step S511 is "NO" or it is determined that the elapsed time T1 has exceeded the given time Tc1, the in-cabin warning LED 122 will be turned OFF (Step S512). While it is determined that the elapsed time T1 falls within the given time Tc1, otherwise the operation in Step S512 is completed, the failure-warning determination element 1126 determines whether or not a turn-ON condition is satisfied (Step S513). The turn-ON condition is elsewhere to a turn-OFF condition which is defined as "when the main switch 101 of the vehicle SV turns ON and the given time elapses after the vehicle speed reaches equal to or greater than 10 km/h". When the turn-ON condition is satisfied in this determination, operations in Step S504 and subsequent steps are performed as with the operations in FIG. 13. If it is determined that the turn-ON condition is not satisfied, the process will advance to Step S503. In Step S503, the failure-warning determination element 1126 controls the in-mirror warning LED 142 to be turned OFF.

In the third embodiment, the failure warning is indicated on the instrument panel 2 on the condition that the elapsed time T1 after initiation of the ON state of the ignition switch 21 falls within the given time Tc1, and the failure warning is indicated on the door mirror 6 on the condition that the above turn-ON condition is satisfied. This allows a passenger to recognize abnormality of the BSD module 110 at adequate timing. In addition, this control can prevent the failure warning from being indicated in a state when the main switch turns OFF or the warning is substantially unnecessary, so as to reduce driver's bothersome feeling.

While the BSD system according to the third embodiment has been described based on one example where a timing condition is set to the failure warning to prevent the warning from being constantly indicated, the position (instrument panel or door mirrors) of the failure warning may be changed depending on the vehicle speed to prevent the warning means from constantly indicating. Specifically, the failure warning is indicated on the instrument panel 2 when the vehicle speed is equal to or less than a given value, and indicated on the door mirror 6 when the vehicle speed exceeds the given value. In this case, for example, the failure warning is indicated on the instrument panel 2 just after initiation of traveling, and the warning position is changed to the door mirror when the vehicle is accelerated and the vehicle speed exceeds the given value. Then, when the vehicle is decelerated and the vehicle speed becomes equal to or less than the given value, the warning position is changed to the instrument panel 2 to indicate a warning.

Fourth Embodiment

Figure 17:
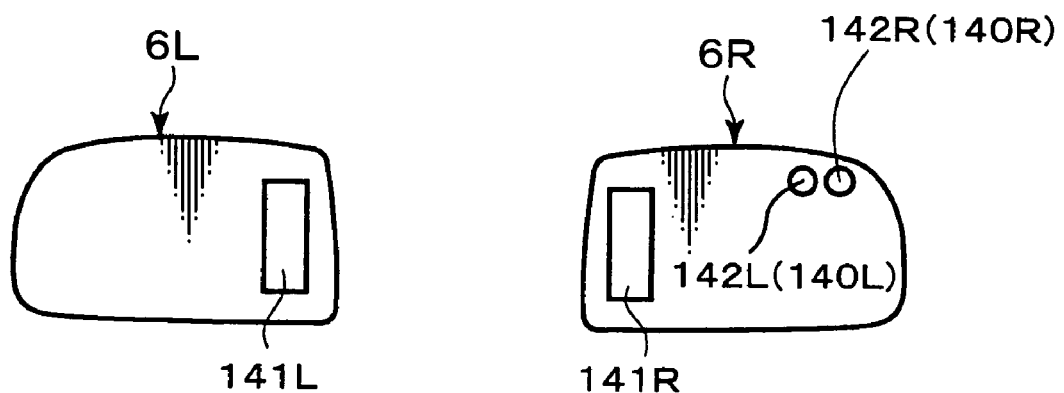
FIG. 17 is a schematic diagram showing a door mirror associated with a BSD system according to a fourth embodiment of the present invention.

As shown in FIG. 17, in a BSD system according to a fourth embodiment of the present invention, both the in-mirror warning LEDs 142R and 142L corresponding, respectively, to the left and right BSD modules 110 are mounted on one of the door mirrors 6 on the side of a driver's seat, and the warning LED 142 for the other door mirror on the side of a front passenger seat is omitted. In FIG. 17, the in-mirror warning LED 142L is preferably arranged on the left side of the in-mirror warning LED 142R. This arrangement allows a driver of the vehicle SV to quickly perceive a failed one of the left and right BSD modules 110 based on a visual check of the in-mirror warning LEDs 142R and 142L mounted on the one door mirror 6.

Fifth Embodiment

Figure 6:
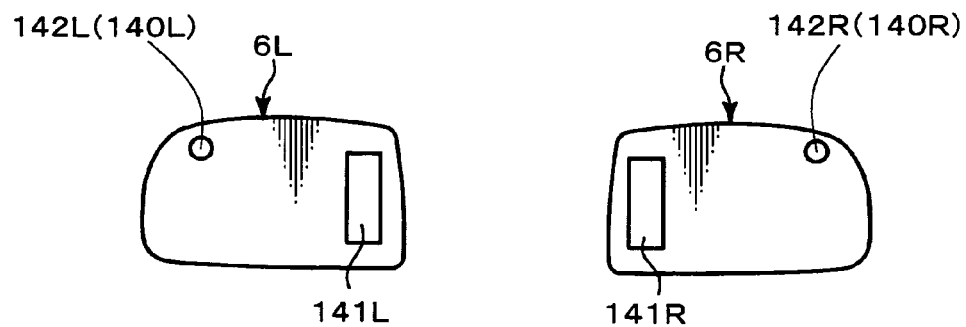
FIG. 6 is a schematic diagram showing a door mirror associated with a BSD system according to a first embodiment of the present invention.

In a BSD system according to a fifth embodiment of the present invention, a pair of left and right in-mirror alert elements arranged in a symmetric manner as with the alert elements in FIG. 6 are employed, and a display control thereof is modified.

Figure 18:
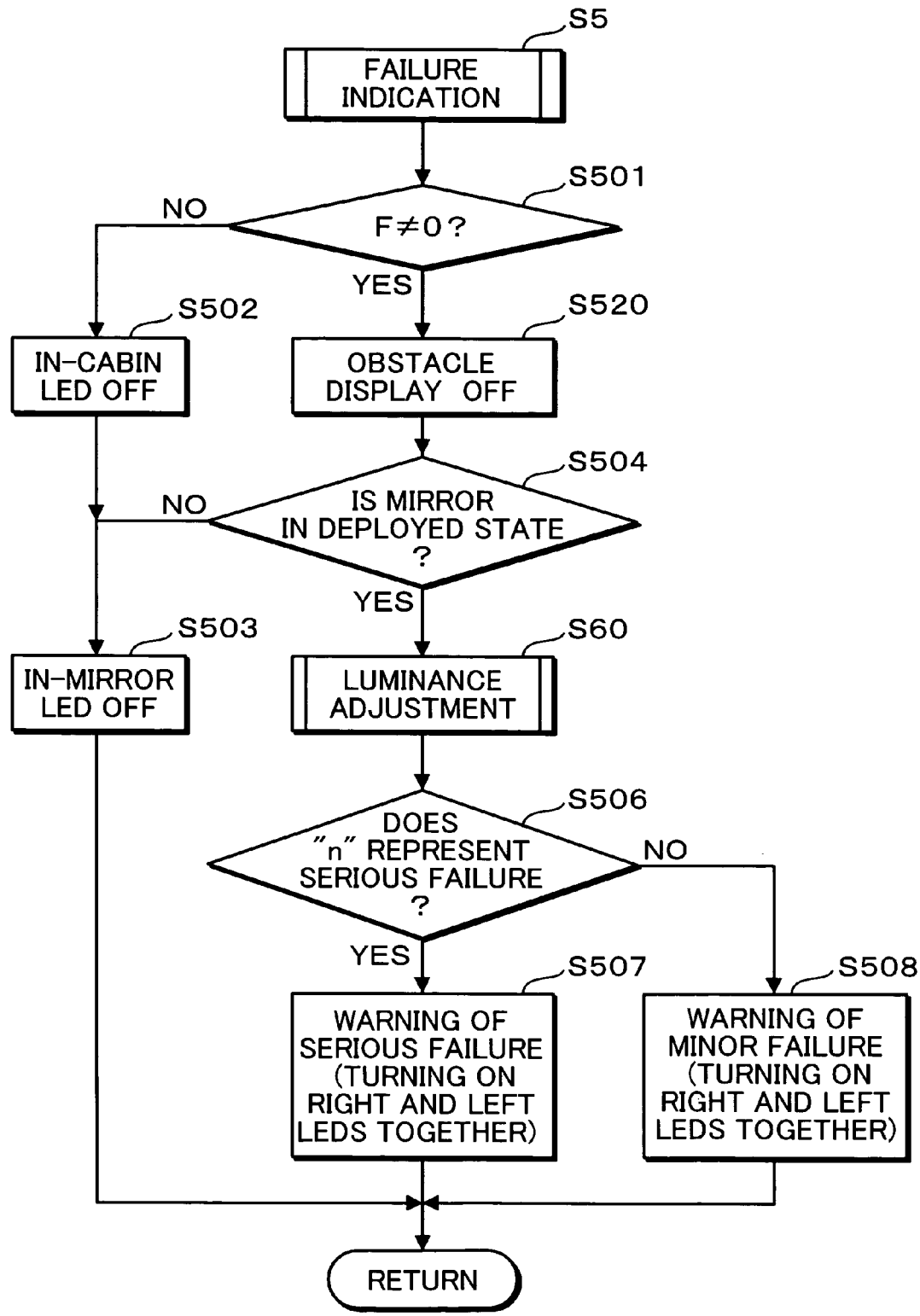
FIG. 18 is a flowchart showing a failure indication subroutine in a BSD system according to a fifth embodiment of the present invention.

More specifically, as shown in FIG. 18, in the failure indication subroutine S5, when the determination in Step S501 is "YES", an obstacle display function of the BSD module 110 in the normal state is deactivated, in advance of the determination on whether or not the door mirrors 6 are in the deployed state, irrespective of conditions of BSD modules 110R or 110L in order to indicate a failure warning (Step S520). Further, when either one of the BSD modules 110 fails, both the in-cabin warning LEDs 122L and 112R and both the left and right in-mirror warning LEDs 142L and 142R are turned ON simultaneously (Steps S507 and S508). Thus, all of the warning LEDs 122L and 122R and 142L and 142R are turned ON in red color in Step S507 while in yellow color in Step S508 according to control of the failure determination element 1125.

In the fifth embodiment, each of the warning LEDs 122 and 142 indicates a failure warning based on a logical add configuration. This allows a passenger on a front passenger seat to readily perceive a failure in the BSD modules 110, as well as a driver.

Sixth Embodiment

Figure 19:
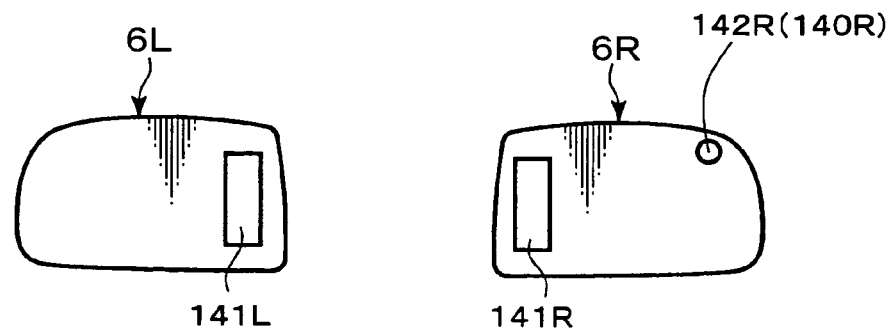
FIG. 19 is a schematic diagram showing a door mirror associated with a BSD system according to a sixth embodiment of the present invention.

As shown in FIG. 19, in a BSD system 110 according to the sixth embodiment of the present invention, a single warning LED 142R is mounted only on one of the door mirrors 6 on the side of the driver's seat of the vehicle SV, and the warning LED 142L on the other door mirror 6L on the side of the passenger seat is omitted. In the sixth embodiment, the same failure indication subroutine as that in FIG. 18 is executed.

The BSD system 110 according to the sixth embodiment allows a driver required for firstly recognizing a failure in the BSD modules 110 to perceive the failure in the BSD modules 110 quickly and reliably.

In addition, the warning LED 142R mounted only on the right door mirror 6L makes it possible to achieve a simplified system configuration.

Seventh Embodiment

Figure 20:
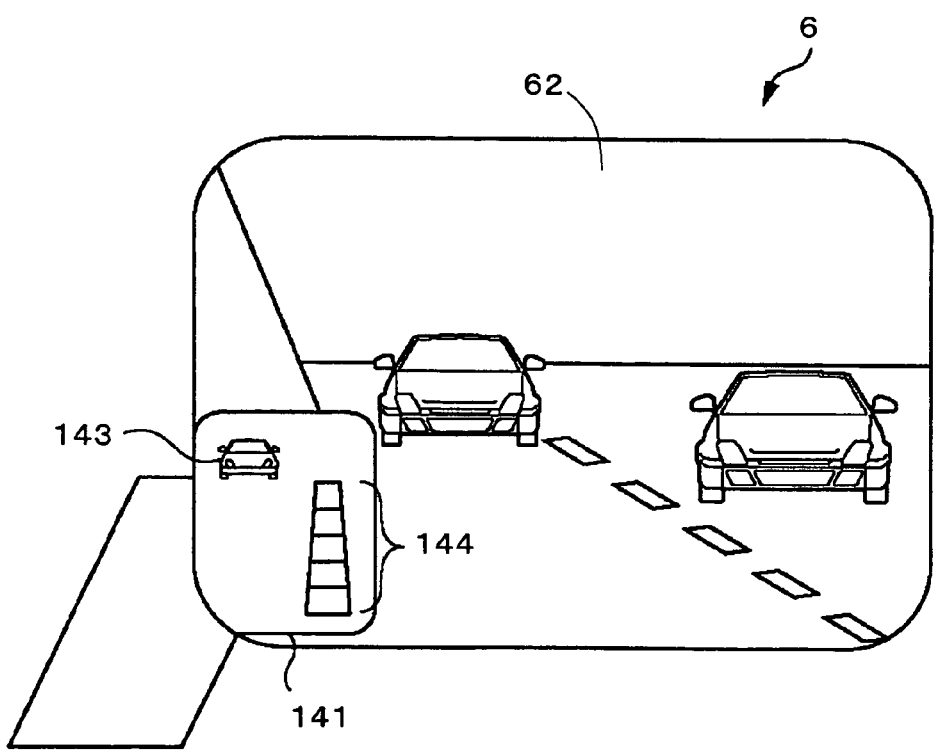
FIG. 20 is a schematic diagram showing a door mirror associated with a BSD system according to a seventh embodiment of the present invention.

As shown in FIG. 20, in a BSD system according to a seventh embodiment of the present invention, a component corresponding to the in-mirror warning means in the first embodiment illustrated in FIGS. 3 and 6 are omitted, and an in-mirror obstacle display unit 141 is designed to be changed in light-emitting direction so as to add an warning function thereto to warn of a failure in the BSD modules 110 in addition to obstacle display based on obstacle information.

Figure 21:
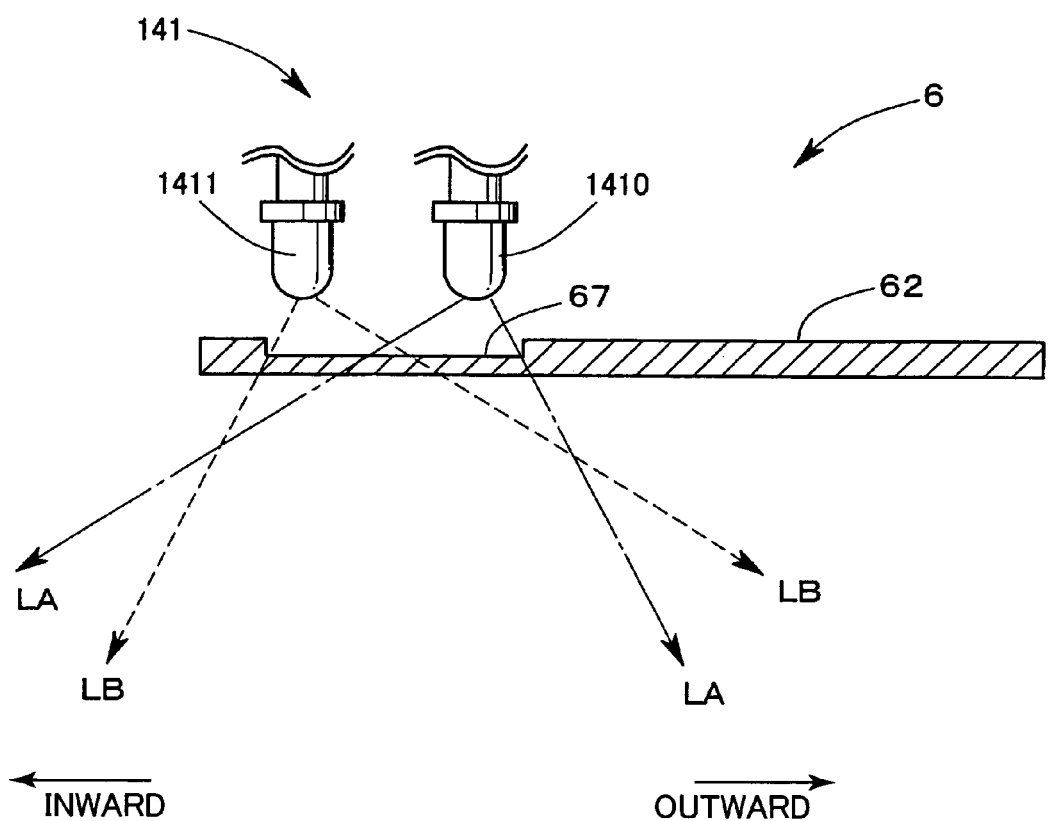
FIG. 21 is a schematic sectional view showing the door mirror associated with the BSD system according to the seventh embodiment.

Referring to FIG. 21, with a view to embodying this structure, the in-mirror obstacle display unit 140 mounted on each of the door mirrors 6 includes a pair of LEDs 1410 and 1411 arranged in a width or lateral direction of the vehicle SV. The LEDs 1410 and 1411 are respectively disposed, facing to the indicator accommodate recess 67, at one of opposite lateral edges (outward of the vehicle body) of the indicator accommodate recess 67 and the other edge (close to the vehicle body). The outward side LED 1410 is designed to emit diffusive light oriented in a direction getting closer to the vehicle body (inwardly-oriented light), as indicated by one-dot chain lines, and the close-side LED 1411 is designed to emit diffusive light oriented in a direction getting away from the vehicle body (outwardly-oriented light), as indicated by broken lines. Each of the LEDs 1410 and 1411 is also designed to selectively emit red and orange lights. In the obstacle display, turned ON is only the LED 1410 which is adapted to emit light in the inward direction LA. In the failure warning, both the LEDs 1410 and 1411 are simultaneously turned ON to warn of a failure in the BSD modules 110. Further, the display 121 is also designed to have both an obstacle display function and a warning function. As mentioned above, the display 121 is composed of a liquid-crystal display and designed to display normality or abnormality in any manner based on a GUI function.

Figure 22:
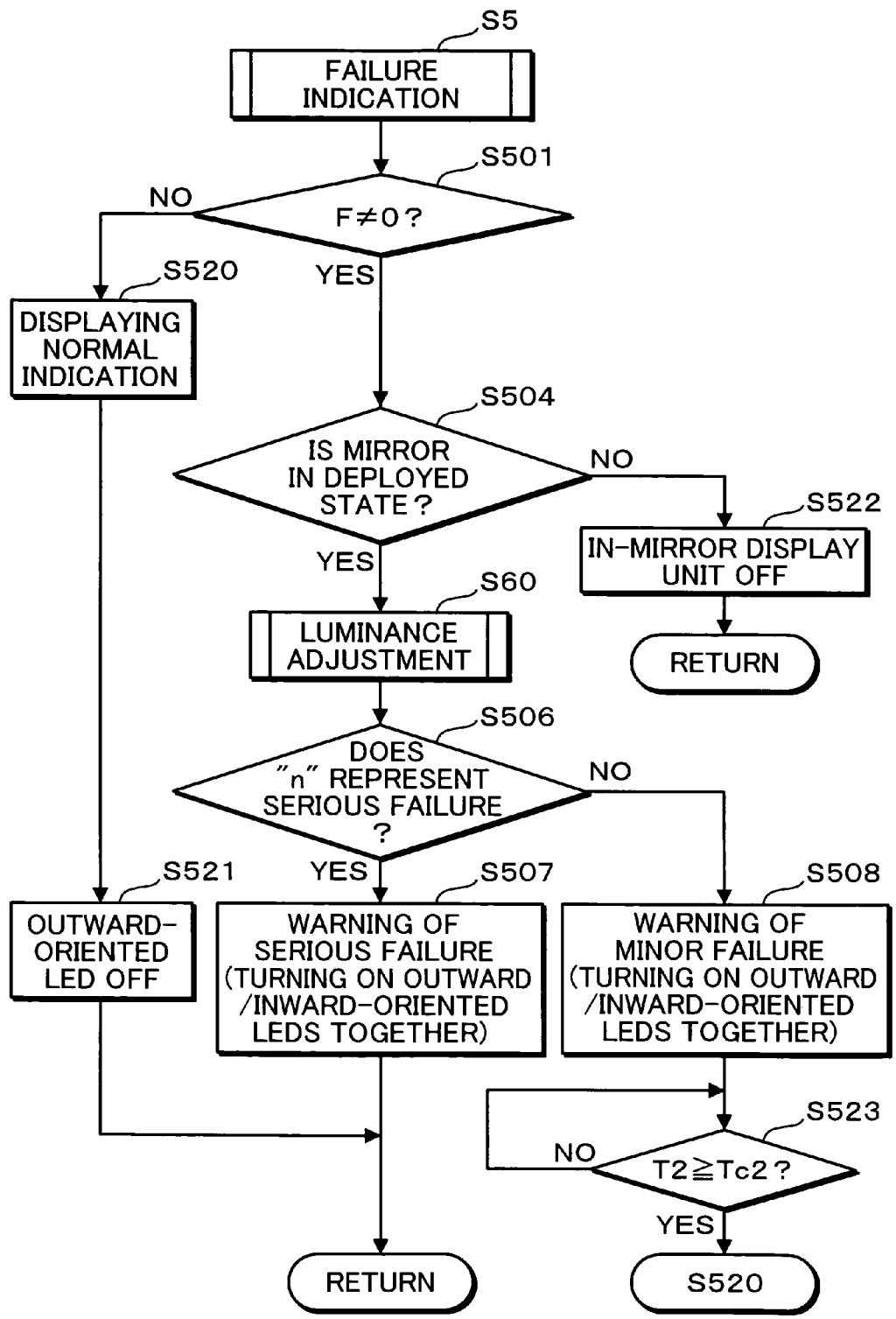
FIG. 22 is a flowchart showing a failure indication subroutine in the BSD system according to the seventh embodiment.

Referring to FIG. 22, the failure indication subroutine S5 is executed in the BSD system having the above structure, as follows. When the determination in Step S501 is "NO" or it is determined that no failure exists, a normal state is indicated on the display 121 (Step S520), and the outwardly-oriented LED 1411 of the in-mirror obstacle display unit 141 in each of the door mirrors 6 is turned OFF (Step S521). Then, the process returns to the main routine. Thus, in the normal state, the in-mirror obstacle display unit 141 emits orange light in the inward direction LA to indicate the normal state of the BSD modules to a passenger.

When a certain failure has occurred ("YES" in Step S501), it is determined whether or not the door mirrors 6 are in the deployed position (Step S506). If the door mirrors 6 are in the folded position ("NO" in Step S504), the in-mirror obstacle display unit 141 will be turned OFF, and then the process will return to the main routine (Step S522), as in the first embodiment.

When the door mirrors 6 are in the deployed position, the aforementioned luminance adjustment subroutine S60 is executed, and the level of the failure is determined (Step S506). If the failure is serious ("YES" in Step S506), information about serious failure is displayed on the display 121. Further, both the LEDs 1410 and 1411 in the in-mirror obstacle display unit 141 are kept in ON, and the process returns to the main routine (Step S507). When the failure is minor ("NO" in Step S506), information about minor failure is displayed on the display 121. Further, both the LEDs 1410 and 1411 in the in-mirror obstacle display unit 141 are turned ON, and it is determined whether or not an elapsed time T2 after turn-ON has exceeded a given time Tc2 (Step S523). When it is determined that the elapsed time has exceeded the given time Tc2, the process advances to Step S520, and then returns to the main routine.

As above, in the seventh embodiment, the in-mirror obstacle display unit 141 executes not only the obstacle display based on obstacle information but also the warning of a failure in the BSD modules 110. This makes it possible to eliminate the need for providing a warning element separately so as to achieve a simplified system configuration.

The BSD system according to the seventh embodiment may be designed such that, when a failure occurs in either one of the left and right BSD modules 110, the LEDs 1410 and 1411 in a corresponding one of the in-mirror obstacle display units 141 are turned ON, or may be designed such that, when a failure occurs in either one of the left and right BSD modules 110, all of the LEDs 1410 and 1411 in the left and right in-mirror obstacle display units 141 are turned ON, as with the BSD system in FIG. 19. This allows a passenger on a front passenger seat to readily perceive a failure in the BSD modules 110, as well as a driver.

Referring to FIG. 9, in one specific example where the in-mirror obstacle display unit 141 serving as both an indicators for obstacle (OV) alert and an indicator for failure, the obstacle (OV) alert may be indicated by lighting the self-vehicle symbol 143 and a part of the segment 144, and the failure may be indicated by blinking the entire segment 144.

Further, the obstacle OV may be indicated only when a given condition is satisfied (when the vehicle speed exceeds 10 km/h, and the risk determination element 1122 determines an execution of alert display for an obstacle), and the failure may be indicated simply when the ignition switch 21 turns ON, regardless of whether or not the main switch 101 turns ON, so as to increase an opportunity to indicate the failure.

As one specific example for indicating an obstacle OV and a failure, respectively, in different modes, the obstacle OV is indicated by lighting icons 143 and 144 (a part of 144), and the failure is indicated by blinking the (entire) icons 143 and 144, as described above. Additionally, the obstacle OV is indicated by turning on orange light, and the failure is indicated by blinking red light. Further, in the failure indication, a different icon or character may be additionally indicated. Any combination of the above techniques may also be used.

Eighth Embodiment

Figure 23:
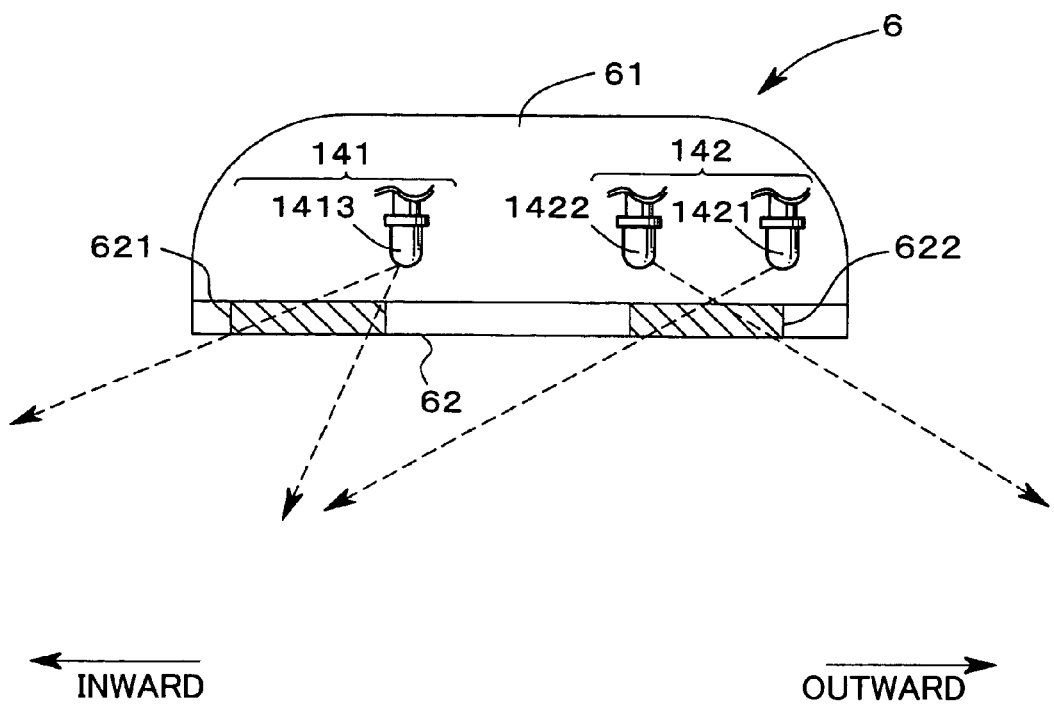
FIG. 23 is a schematic sectional view showing a door mirror associated with a BSD system according to an eighth embodiment of the present invention.

FIG. 23 shows a BSD system according to an eighth embodiment of the present invention. The BSD system according to the eighth embodiment comprises an in-mirror obstacle display units 141 formed at a position adjacent to the vehicle body, and an in-mirror alert unit 142 formed at a position far from the vehicle body.

Each of the units 141 and 142 includes a luminous portion (621 and 622) formed in the mirror glass 62, and a light source (1413, 1421, and 1422) housed in a frame 61.

The luminous portion 621 of the in-mirror obstacle display units 141 is designed to display an image symbol as shown in FIG. 9.

The light source 1413 is displaced relative to the luminous portion 621 in a direction getting away from the vehicle body. Base on this arrangement, light emitted from light source 1413 and transmitted through the luminous portion 621 is oriented in a direction toward a passenger of the vehicle SV.

The luminous portion 622 of the in-mirror alert unit 142 is formed as a half mirror structure having a given width in the lateral direction of the vehicle. The light sources 1421, 1422 are arranged spaced apart from each other in a width direction of the luminous portion 622. Among them, the light source 1421 is disposed at a position allowing light transmitted through luminous portion 622 to be oriented in a direction toward the vehicle body and a driver, and the light source 1422 is disposed at a position allowing light transmitted through luminous portion 622 to be oriented in a direction getting away from the vehicle body. That is, the in-mirror alert unit 142 is designed to enlarge a divergence angle outward relative to the vehicle (in a laterally outward direction of the vehicle).

The light source 1413 is adapted to emit light of a different color from those of the light sources 1421, 1422. For example, light source 1413 emits orange light, and each of the light sources 1421, 1422 emits red color. Thus, the passenger can readily discriminate between respective indications of obstacle alert and BSD failure. In addition, an execution of the BSD failure indication can also be recognized outside the vehicle.

As above, the in-mirror alert unit 142 in this embodiment is designed such that a divergence angle of indication is enlarged in a laterally outward direction of the vehicle. This allows the failure indication to be recognized from another vehicle, such as a vehicle traveling along an adjacent lane, so as to trigger an appropriate action according to need.

Ninth Embodiment

Figure 24:
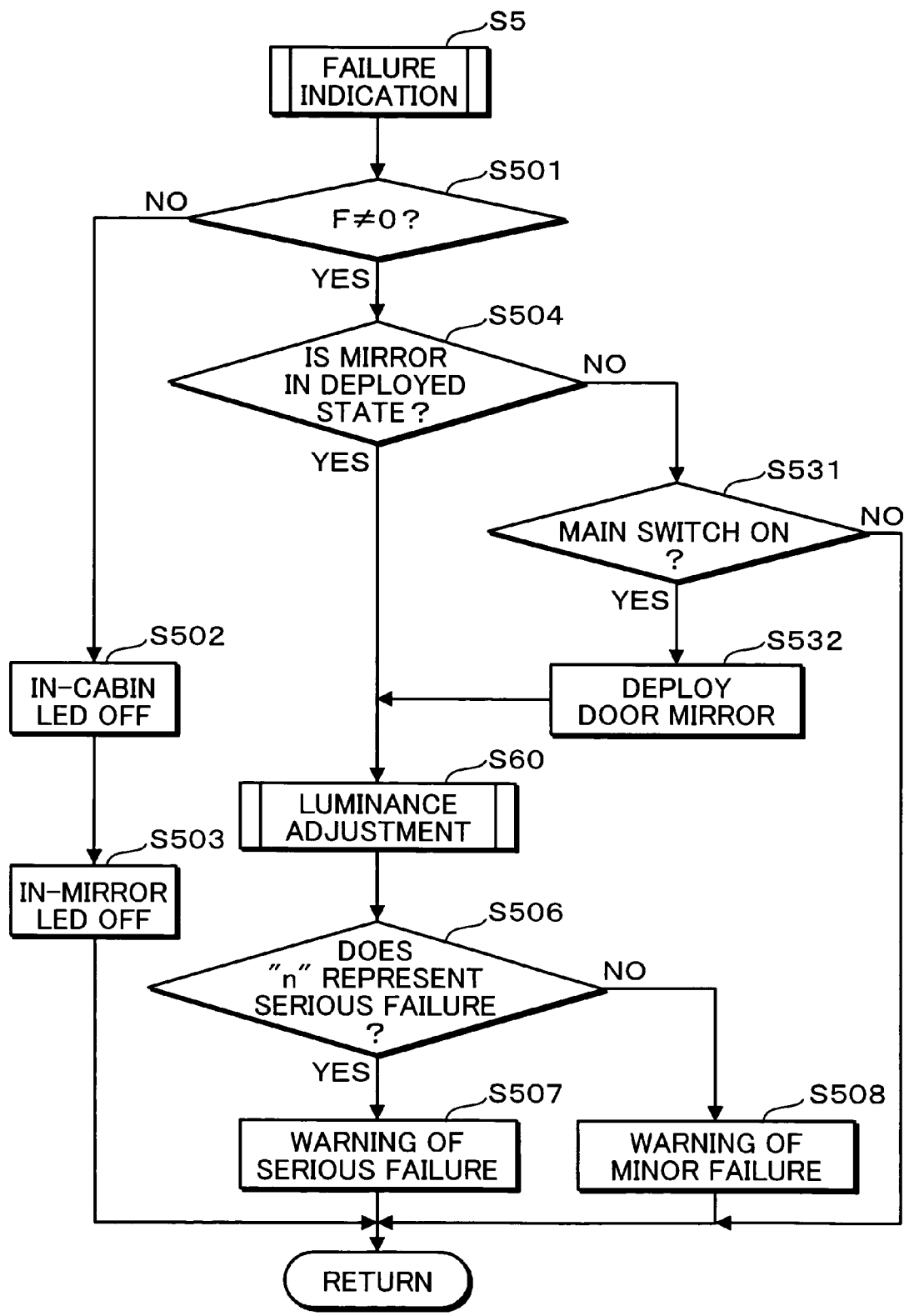
FIG. 24 is a flowchart showing a failure indication subroutine in a BSD system according to a ninth embodiment of the present invention.

FIG. 24 shows a BSD system according to a ninth embodiment of the present invention. In the ninth embodiment, when the mirrors 6 are in folded position as a result of detection (Step S504), it is determined whether or not the main switch 101 turns ON (Step S531). If the main switch 101 turns ON, the mirrors 6 are moved to the deploy position (Step S532). In this case, when the side mirrors are in folded position, and an instruction for activating the BSD system is issued, the door mirrors or side mirrors are automatically deployed according to the door-mirror control element 1129 serving as mirror drive means. This makes it possible to determine whether or not abnormality exists in the BSD system, during activation of the BSD system.

Tenth Embodiment

Figure 25:
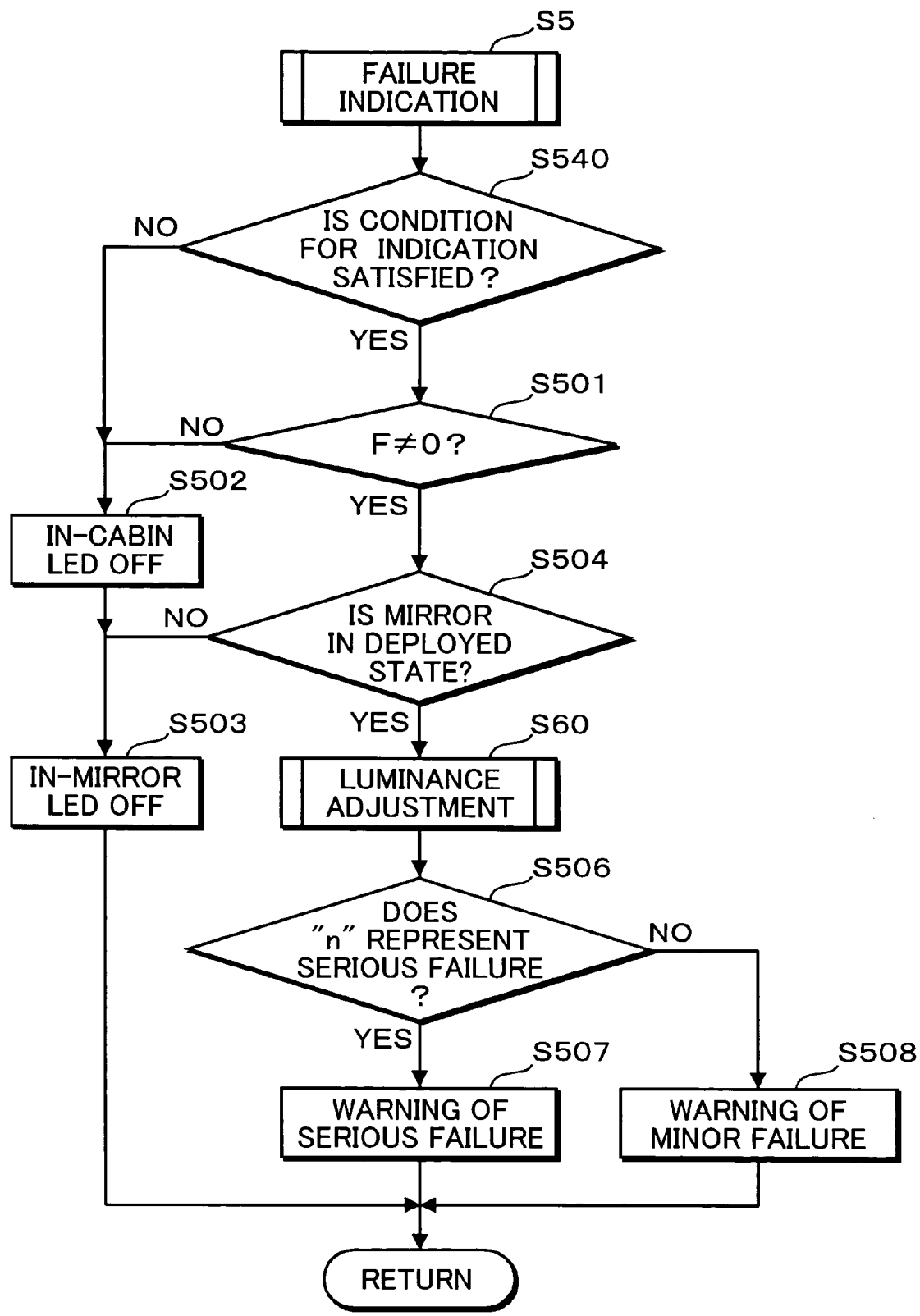
FIG. 25 is a flowchart showing a failure indication subroutine in a BSD system according to a tenth embodiment of the present invention.

FIG. 25 shows a BSD system according to a tenth embodiment of the present invention. When the failure indication subroutine S5 is executed in the tenth embodiment, it is determined whether or not a give condition for displaying an obstacle indicator 141 is satisfied (Step S540). Only when the condition is satisfied, the failure flag F is read to perform the warning processing. In this embodiment, abnormality of the BSD system is warned after the BSD system becomes highly likely to be used. Thus, an indication pattern or mode can be designed adequately and specifically in consideration of use conditions, so as to provide enhanced mode in terms of ergonomic.

Other Embodiments

The present invention is not limited to the above embodiments, but various changes and modification may be made therein. The specific arrangements and configurations of the BSD systems according these embodiments are shown and described by way of example, and any other suitable arrangement/configuration capable of alert or indication about rearward obstacle and system failure may be used.

For example, in the above embodiments, as to the obstacle alert, an obstacle OV existing in a blind spot SL or SR around a self vehicle SV and getting closer to the self vehicle SV is alert by displaying an icon in a door mirror. In addition to or in place of such information, at least one of information about the existence of the obstacle OV, a distance between the self vehicle SV and the obstacle OV, and a relative speed of the obstacle OV to the self vehicle SV nay be displayed or indicated, in a different manner or mode.

As to the failure indication, while the above embodiments have been described based on one example where the luminous portion in a door mirror is lighted up, any other suitable conventional technique may be used therefor.

Further, while the above embodiments have been described based on one example where the obstacle alert is displayed when the vehicle speed exceeds 10 km/h, any other suitable condition for displaying the obstacle alert may be used. For example, the obstacle alert may be displayed when a risky obstacle is detected, or when a risky obstacle is detected and a turn-indicator lever is operated with intent to turn a vehicle toward the obstacle.

In the above embodiment, with a view to enlarging a divergence angle of the failure indication in a laterally outward direction of a vehicle, the structure using two light sources are employed. Alternatively, the divergence angle may be enlarged using a single light source and optical means, such as lens.

Further, while the above embodiments have been described based on one example of detection means which comprises two millimeter-wave radars mounted on the left and right sided in the rear of a vehicle, it is understood that any other suitable detection means having an desired detection range, such as other type of radar or a sensor including a camera, may be used.

Accordingly, includes obstacle in blind spot detection means for detecting an obstacle existing in a blind spot around the rear side of a self vehicle and an obstacle indicator disposed on a side mirror of the self vehicle and adapted to display at least one of information for the existence of an obstacle in the blind spot, for a distance between said obstacle and the self vehicle, and for a relative speed of said obstacle to the self vehicle, said blind-spot detection system for vehicle. The blind-spot detection system for vehicle is provided with abnormality detection means for detecting that the blind spot detection module is in an abnormal operation state and warning means disposed on the side mirror having the obstacle indicator and adapted to visually indicate an abnormality of the blind spot detection module detected by the abnormality detection means.

In the above blind-spot detection system for vehicle of the present invention, the warning means in the side mirror is visually recognized simultaneously by a passenger when the passenger, particularly the driver of the vehicle visually checks the display means in the side mirror. In addition, the warning means is mounted on the side mirror having neither warning lamps nor meters except for the display means. Thus, an abnormality detected by warning means and indicated by the obstacle indicator can be readily recognized.

In a preferred aspect of the present invention, the blind-spot detection system for vehicle is further provided with a mirror member included in said side mirror and is adapted to be moved between an deploy position where said mirror member deploys to mirror the rearward sight of the self vehicle and a folded position where said mirror member is folded substantially abutting to a body of the self vehicle and warning control means for controlling said warning means to visually indicate the abnormality when said side mirror is in said deploy position.

In another preferred embodiment of the present invention, the blind-spot detection system for vehicle is further provided with a system start switch for switching the blind spot detection module between its ON and OFF states and mirror drive means which is operable when the side mirror is in the folded position, and the blind spot detection module is turned ON by the system start switch, to move the side mirror from the folded position to the deploy position.

In another preferred embodiment of the present invention, the blind-spot detection system for vehicle is further provided with mirror drive means which is operable, when the side mirror is in the folded position, to move the side mirror from the folded position to the deploy position in response to the detection of an abnormality of the blind spot detection module detected by the abnormality detection means.

In another preferred embodiment of the present invention, the blind-spot detection system for vehicle is further provided with dark environment detection means for detecting a dark environment in case the self vehicle is driving therein and warning-luminance adjustment means operable to lower a luminance of an optical indication of the warning means when the dark environment detection means detects the dark environment.

In another preferred embodiment of the present invention, the blind-spot detection system for vehicle is further provided with indicator-luminance adjustment means which is operable to lower a display luminance of the obstacle indicator when the dark environment detection means detects the dark environment. In this case, the warning-luminance adjustment means is adapted to lower a luminance at a rate greater than that of the indicator-luminance adjustment means.

In another preferred embodiment of the present invention, the blind-spot detection system for vehicle is further provided with antiglare means associated with the door mirror, and antiglare-function control means for adjusting an antiglare level of the antiglare means in such a manner that the antiglare level is increased in response to detection of the abnormality.

In another preferred embodiment of the present invention, the blind-spot detection system for vehicle is further provided with an antiglare-function switch, included in the self vehicle, for selectively activating and deactivating the antiglare means in a manual manner. The antiglare-function control means is operable to forcibly activate the antiglare means irrespective of a state of the antiglare-function switch when the warning means is activated.

In another preferred embodiment of the present invention, the obstacle indicator is operable to display information relevant to an obstacle detected by the obstacle in blind spot detection means, provided that a traveling state meets with a display condition under which the self vehicle is in a given traveling state; and the warning means is operable to visually indicate an abnormality detected by the abnormality detection means when the traveling state meets with the display condition.

In another preferred embodiment of the present invention, the warning means is operable to visually indicate the abnormality of the blind spot detection module when the self vehicle is in the given traveling state and in additional traveling state.

In another preferred embodiment of the present invention, the warning means is operable to visually indicate the abnormality of the blind spot detection module when the driving state meets with the display condition.

In another preferred embodiment of the present invention, the warning means is operable to visually indicate the abnormality of the blind spot detection module in a period before a given time has elapsed after the traveling state meets with the display condition.

In another preferred embodiment of the present invention, the blind-spot detection system for vehicle is further provided with determination means for determining a level of seriousness of the abnormality detected by the abnormality detection means. The warning means is operable to change a display mode of the obstacle indicator to a first display mode in which the obstacle indicator indicates the abnormality when the determination means determines that the abnormality detected by the abnormality detection means is minor and to a second display mode in which the obstacle indicator indicates the abnormality when the determination means determines that the abnormality detected by the abnormality detection means is serious.

In another preferred embodiment of the present invention, the blind-spot detection system for vehicle is further provided with: a mirror member which is included in the side mirror and is to reflect images of back side sight of the self vehicle; a first light-emitting element which is included in the obstacle indicator and is disposed on the side of a back surface of the mirror member of the side mirror; a second light-emitting element which is included in the obstacle indicator and is disposed at a position spaced apart from the first light-emitting element by a give distance on the side of the body of the self vehicle; a graphic image formed on the mirror member by respective emitted lights from the first and second light-emitting elements; and means for indicating plurality of information by changing at least one of directions of emitted light from the first and second light-emitting elements to form the graphic image.

In another preferred embodiment of the present invention, the blind-spot detection system for vehicle is further provided with in-cabin warning means disposed in a passenger compartment of the self vehicle and adapted to visually indicate an abnormality of the blind spot detection module detected by the abnormality detection means, wherein the in-cabin warning means is operable to visually indicate the abnormality of the blind spot detection module when an ignition switch of the self vehicle is placed in its ON state.

In another preferred embodiment of the present invention, the blind-spot detection system for vehicle is further provided with in-cabin warning means disposed in a passenger compartment of the self vehicle and adapted to visually indicate an abnormality of the blind spot detection module detected by the abnormality detection means. In this case, the warning means is operable, in at least one of first and second periods: in which the first period is set when a first given time has elapsed after the ignition switch is turned ON and the second period is set when a second given time has elapsed after satisfaction of the display condition of the obstacle indicator.

In another preferred embodiment of the present invention, the warning means is disposed on a laterally outward side of the door mirror relative to the obstacle indicator.

In another preferred embodiment of the present invention, the warning means is disposed in an upper area of the door mirror.

In another preferred embodiment of the present invention, the warning means is designed such that a divergence angle of the indication is enlarged in a laterally outward direction relative to that of the obstacle indicator.

In another preferred embodiment of the present invention, the blind spot detection module includes: a left blind spot detection module which has a left-rear-side obstacle detection mean that detects an obstacle existing in the left rear side of the self vehicle and a left obstacle indicator mounted on a left side mirror of the self vehicle and adapted to display information relevant to an obstacle detected by the obstacle detection mean in left rear side; and a right blind spot detection module which has a right-rear-side obstacle detection mean that detects an obstacle existing in the right rear side of the self vehicle and a right obstacle indicator mounted on a right side mirror of the self vehicle and adapted to display information relevant to an obstacle detected by the obstacle detection mean in right rear side. The abnormality detection means includes left abnormality detection means for detecting that the left blind spot detection module is in an abnormal state, and right abnormality detection means for detecting that the right blind spot detection module is in an abnormal state. Further, the warming means includes left warning means mounted on the left side mirror of the self vehicle and adapted to indicate only an abnormality of the left blind spot detection module detected by the left abnormality detection means and right warning means mounted on the right side mirror of the self vehicle and adapted to indicate only an abnormality of the right blind spot detection module detected by the right abnormality detection means.

In another preferred embodiment of the present invention, the blind spot detection module includes: a left blind spot detection module which has a left-rear-side obstacle detection mean that detects an obstacle existing in the left rear side of the self vehicle and a left obstacle indicator mounted on a left side mirror of the self vehicle and adapted to display information relevant to an obstacle detected by the obstacle detection mean in left rear side; and a right blind spot detection module which has a right-rear-side obstacle detection mean that detects an obstacle existing in the right rear side of the self vehicle and a right obstacle indicator mounted on a right side mirror of the self vehicle and adapted to display information relevant to an obstacle detected by the obstacle detection mean in right rear side. The abnormality detection means includes left abnormality detection means for detecting that the left blind spot detection module is in an abnormal state, and right abnormality detection means for detecting that the right blind spot detection module is in an abnormal state. Further, the warming means includes left warning means mounted on the left side mirror of the self vehicle and adapted to indicate both abnormalities of the left and right blind spot detection modules respectively detected by the left and right abnormality detection means and right warning means mounted on the right side mirror of the self vehicle and adapted to indicate both abnormalities of the left and right blind spot detection modules respectively detected by the left and right abnormality detection means.

In another preferred embodiment of the present invention, the blind spot detection module includes: a left blind spot detection module which has a left-rear-side obstacle detection mean that detects an obstacle existing in the left rear side of the self vehicle and a left obstacle indicator mounted on a left side mirror of the self vehicle and adapted to display information relevant to an obstacle detected by the obstacle detection mean in left rear side; and a right blind spot detection module which has a right-rear-side obstacle detection mean that detects an obstacle existing in the right rear side of the self vehicle and a right obstacle indicator mounted on a right side mirror of the self vehicle and adapted to display information relevant to an obstacle detected by the obstacle detection mean in right rear side. The abnormality detection means includes left abnormality detection means for detecting that the left blind spot detection module is in an abnormal state, and right abnormality detection means for detecting that the right blind spot detection module is in an abnormal state. Further, the warming means includes left warning means which indicates an abnormality of the left blind spot detection module detected by the left abnormality detection means and right warning means which indicates an abnormality of the right blind spot detection module detected by the right abnormality detection means. The left and right warning means are mounted on a side mirror of the self vehicle on the side of a driver's seat.

In another preferred embodiment of the present invention, the warning means is operable to change a display mode of the obstacle information for the obstacle indicator, to a given mode different from a normal mode so as to indicate an abnormality detected by the abnormality detection means.

In another preferred embodiment of the present invention, the obstacle indicator and the warning means are composed of a common component.

In a specific embodiment of the present invention, a control unit and a BS radar may be mounted on a common board and connected to each other through a given input/output device. This makes it possible to eliminate the need for connecting the control unit and the BS radar using a sub-harness, so as to facilitate wiring and maintenance.

As mentioned above, in the BSD system of the present invention, when a passenger (particularly, driver) of a vehicle visually checks the obstacle indicator in a side mirror using the BSD system, the warning means in the side mirror is visually recognized simultaneously. Thus, the passenger can reliably perceive a failure of the BSD system during use of the BSD system. In addition, the warning means can be readily identified to facilitate perceive a failure of the BSD system through the warning means.

Further, according to the present invention, when a driver of a vehicle visually checks the obstacle indicator in a side mirror, the warning means in the side mirror can be visually recognized simultaneously. Thus, the driver can reliably perceive a failure of the BSD system during use. In addition, the warning means can be readily identified to facilitate perceive a failure of the BSD system using the warning means.

Further, when side mirrors are in the folded position, or the BSD system is less likely to be used, the warning means can be kept from warning of abnormality, so as to reduce driver's bothersome feeling due to an unnecessary warning.

According the present invention, the presence of abnormality in the BSD system can be checked during activation of the BSD system, so as to perceive the occurrence of abnormality in the BSD system at appropriate timing.

In the present invention, the side mirrors may be designed to be moved in connection with the failure warning. In this case, even if the side mirrors are in the folded position, they can be moved to the deploy position to allow the passenger to quickly perceive a failure of the BSD system.

In the present invention, the warning means may be designed to lower a display luminance thereof in response to a detection of the night or similar environment. This makes it possible to prevent an indication about a failure or abnormality from hindering a rearward visibility based on the door mirror, when a vehicle travels in the night or dark environments. This also makes it possible to prevent an indication about a failure or abnormality from hindering a rearward visibility based on the door mirror, when a vehicle travels in the night or dark environments.

In the present invention, the obstacle indicator may also be designed to lower a display luminance thereof in response to a detection of the night or similar environment. In this case, the display luminance of the warning means may be lowered at a larger rate than that of the display luminance of the obstacle indicator. Thus, when information relevant to an obstacle is indicated together with the warning of abnormality, the warning of abnormality to be indicated for a relatively long time-period has a larger luminance lowering rate, so as to allow the passenger to adequately check the obstacle information while reducing passenger's bothersome feeling due to the warning of abnormality.

In the present invention, when the door mirror has antiglare means, antiglare control means may be operable, when the abnormality is detected, to increase an antiglare level of the antiglare means. This makes it possible to prevent the warning of abnormality from being indicated in poor visibility, even if strong light, such as light from headlights of a following vehicle, etc., is reflected on the door mirror.

Further, the antiglare control means may be operable, when the warning means is operated, to forcedly drive the antiglare means, irrespective of a state of antiglare function switch. This makes it possible to prevent the warning of failure from being indicated in poor visibility, even if strong light, such as light from headlights of a following vehicle, etc., is reflected on the door mirror.

In the present invention, the warning of detected abnormality may be controlled in such a manner that it is kept from being indicated in a traversing state when the obstacle indicator is deactivated or the warning of abnormality is substantially unnecessary, so as to reduce driver's bothersome feeling.

In the present invention, the obstacle information may be indicated when the vehicle travels in a given condition, and the warning of abnormality may be indicated when the vehicle travels in the given condition and in another condition. This makes it possible to increase an opportunity to indicate the warning of abnormality. This allows a passenger of the self vehicle and other persons, such as a passenger of a vehicle traveling along adjacent lanes, to quickly perceive the abnormality in the BSD system of this vehicle.

In the present invention, the warning of detected abnormality may be controlled in such a manner that it is kept from being indicated in a traveling state when there is no need to indicate information on the obstacle indicator or the warning of abnormality is substantially unnecessary, so as to reduce driver's bothersome feeling.

In the present invention, the in-mirror warning means may be controlled in such a manner that the warning of abnormality in the BSD system is kept from being indicated on the side mirror for a long time, so as to reduce driver's bothersome feeling.

In the present invention, the warning means may be controlled in such a manner that the warning of abnormality is indicated in a mode to be varied based on a determination result from determination means for determining the level of abnormality. This makes it possible to achieve a simplified system configuration.

In the present invention, as shown in FIG. 21, based on lights emitted from first and second light-emitting elements, a graphic image orienting in both directions getting closer to and away from the vehicle body may be formed. This makes it possible to warn of a failure of the BSD system to not only a driver of the self vehicle but also a driver of a following vehicle in a blind spot around the self vehicle.

In the present invention, the warning of abnormality in the BSD system may be indicated in a passenger compartment or cabin during engine starting to allow a passenger to recognize the abnormality in an early stage. As compared with the warning of abnormality designed to be performed using the side mirror during engine starting, the warning of abnormality indicated in the passenger compartment is makes it possible to reduce driver's bothersome feeling.

In the present invention, the warning of abnormality in the BSD system may be indicated just after engine starting and when the obstacle indicator is activated to indicate obstacle information, while preventing the warning of abnormality in the BSD system from being indicated on the side mirror. This allows a passenger to recognize the abnormality in the BSD system in earlier stage at adequate timing, while reducing driver's bothersome feeling.

The warning means may be disposed on a laterally outward side of the door mirror, relative to the obstacle indicator. In this case, the warning of abnormality is indicated on the side mirror together with information about a rearward obstacle. This allows a passenger to perceive the abnormality readily and reliably. In addition, the warning of abnormality is indicated in such a manner as to be visually recognized from the outside of the self vehicle, such as a vehicle traveling adjacent lanes, so as to trigger an appropriate action according to need.

In the present invention, the warning means may be disposed in a laterally-outward and upper region of a mirror surface of the side door. In this case, the warning of abnormality is indicated at a position where light from headlight of a following vehicle is less likely to be reflected thereon. This makes it possible to prevent the warning of abnormality from being indicated in poor visibility.

Further, the warning means may indicate a warning in a manner different from that of the obstacle indicator, and a divergence angle of the warning indication is enlarged in a laterally outward direction relative to that of a rearward obstacle. In this case, the warning of abnormality is indicated in a different manner from that of the information about rearward obstacle. This allows a passenger to perceive the occurrence of abnormality readily and reliably. In addition, the warning of abnormality is indicated in such a manner as to be visually recognized from the outside of the self vehicle, such as a vehicle traveling adjacent lanes, so as to trigger an appropriate action according to need.

Further, the BSD system may be configured to allow a failure occurring in a left BSD module to be figured out by a left side mirror, and allow a failure occurring in a right BSD module to be figured out by a right side mirror. This makes it possible to adequately perceive a failed one of the BSD modules during use of the BSD system.

Alternatively, the BSD system may be configured to indicate both abnormalities detected by left abnormality detection means and right abnormality detection means, on each of the left and right side mirrors. This allows a failure in the BSD modules to be readily figured out by not only a driver but also a passenger on a front passenger seat.

Alternatively, the BSD system may be configured to allow a failure in the BSD modules to be figured out based on a side mirror on the side of a driver's seat. This allows a driver required for firstly recognizing a failure in the BSD modules to perceive the failure in the BSD modules quickly and reliably. In addition, this makes it possible to achieve a simplified system configuration, as compared with a case of providing warning means to a side mirror on the side of the front passenger seat separately.

The obstacle indicator may be designed to additionally indicate the warning of detected abnormality to a passenger, when a vehicle travels in the aforementioned given condition and in another condition. In this case, the warning of abnormality is indicated together with information about a rearward obstacle on a common obstacle indicator. This allows a passenger to perceive the occurrence of abnormality readily and reliably in a simplified configuration. In addition, the warning of abnormality is indicated not only in the given condition but also in another condition, so as to allow the passenger to reliably perceive the occurrence of abnormality.

The BSD system designed to indicate both the warning of abnormality and the information about obstacle on a common element makes it possible to eliminate the need for using a warning element and others separately as the warning means. This makes it possible to achieve a simplified system configuration.

Although the present invention has been described in term of specific exemplary embodiments, it will be appreciated that various changes and modifications may be made by those skilled in the art without departing from the spirits and scope of the invention, defined in the following claims.

What is claimed is:

1. A blind-spot detection system for vehicle provided with a blind spot detection module which includes obstacle in blind spot detection unit for detecting an obstacle existing in a blind spot around the rear side of a self vehicle and an obstacle indicator disposed on a side mirror of the self vehicle and adapted to display at least one of information for the existence of the obstacle in the blind spot, for a distance between said obstacle and the self vehicle, and for a relative speed of said obstacle to the self vehicle, said blind-spot detection system for vehicle comprising:

a failure detection unit configured to detect an abnormal operation state of the blind spot detection module;

a failure storage unit configured to store data corresponding to the abnormal operation state of the blind spot detection module detected by said failure detection unit; and a warning unit disposed on said side mirror having said obstacle indicator and adapted to visually indicate the abnormal operation state of said blind spot detection module based on the data corresponding to the abnormal operation state of the blind spot detection module in said failure storage unit.

2. The blind-spot detection system for vehicle as defined in claim 1, which further comprises a mirror member included in said side mirror and is adapted to be moved between an deploy position where said mirror member deploys to mirror the rearward sight of the self vehicle and a folded position where said mirror member is folded substantially abutting to a body of the self vehicle; and a warning control unit configured to control said warning unit to visually indicate the the abnormal operation state when said side mirror is in said deploy position.

3. The blind-spot detection system for vehicle as defined in claim 2, which further comprises a system start switch for switching said blind spot detection module between its ON and OFF states; and a mirror drive unit which is operable to move said side mirror from said folded position to said deploy position when said side mirror is in the folded position and said blind spot detection module is turned ON by said system start switch.

4. The blind-spot detection system for vehicle as defined in claim 2, which further comprises mirror drive unit which is operable, when said side mirror is in the folded position, to move said side mirror from said folded position to said deploy position in response to the detection of an abnormality of said blind spot detection module detected by said failure detection unit.

5. The blind-spot detection system for vehicle as defined in claim 1, which further comprises a dark environment detection unit configured to detect a dark environment in case the self vehicle is driving therein; and a warning-luminance adjustment unit operable to lower a luminance of an optical indication of said warning unit when said dark environment detection unit detects the dark environment.

6. The blind-spot detection system for vehicle as defined in claim 5, which further comprises an indicator-luminance adjustment unit which is operable to lower a display luminance of said obstacle indicator when said dark environment detection unit detects the dark environment, wherein said warning-luminance adjustment unit is adapted to lower a luminance at a rate greater than that of said indicator-luminance adjustment unit.

7. The blind-spot detection system for vehicle as defined in claim 1, which further comprises an antiglare unit associated with said side mirror and antiglare-function control unit configured to adjust an antiglare level of said antiglare unit in such a manner that said antiglare level is increased in response to detection of said abnormal state.

8. The blind-spot detection system for vehicle as defined in claim 7, further comprises an antiglare-function switch, included in the self vehicle, for selectively activating and deactivating said antiglare unit in a manual manner, wherein said antiglare-function control unit is operable to forcibly activate said antiglare unit irrespective of a state of said antiglare-function switch when said warning unit is activated.

9. The blind-spot detection system for vehicle as defined in claim 1, wherein said obstacle indicator is operable to display information relevant to an obstacle detected by said obstacle in blind spot detection unit, provided that a traveling state meets with a display condition under which the self vehicle is in a given traveling state; and said warning unit is operable to visually indicate an abnormality detected by said failure detection unit when the traveling state meets with the display condition.

10. The blind-spot detection system for vehicle as defined in claim 9, wherein said warning unit is operable to visually indicate the abnormality of said blind spot detection module when the self vehicle is in the given traveling state and in additional traveling state.

11. The blind-spot detection system for vehicle as defined in claim 9, wherein said warning unit is operable to visually indicate the abnormality of said blind spot detection module when the driving state meets with the display condition.

12. The blind-spot detection system for vehicle as defined in claim 9, wherein said warning unit is operable to visually indicate the abnormality of said blind spot detection module in a period before a given time has elapsed after the traveling state meets with the display condition.

13. The blind-spot detection system for vehicle as defined in claim 1, which further comprises determination unit configured to determine a level of seriousness of the abnormality detected by said failure detection unit, wherein said warning unit is operable to change a display mode of said obstacle indicator to a first display mode in which said obstacle indicator indicates the abnormality when said determination unit determines that the abnormality detected by said failure detection unit is minor and to a second display mode in which said obstacle indicator indicates the abnormality when said determination unit determines that the abnormality detected by said failure detection unit is serious.

14. The blind-spot detection system for vehicle as defined in claim 1, which further comprises:
   a mirror member which is included in said side mirror and is to reflect images of back side sight of the self vehicle;
   a first light-emitting element which is included in said obstacle indicator and is disposed on the side of a back surface of said mirror member of said side mirror;
   a second light-emitting element which is included in said obstacle indicator and is disposed at a position spaced apart from said first light-emitting element by a give distance on the side of the body of the self vehicle;
   a graphic image formed on said mirror member by respective emitted lights from said first and second light-emitting elements; and
   an indicator for indicating plurality of information by changing at least one of directions of emitted light from said first and second light-emitting elements to form the graphic image.

15. The blind-spot detection system for vehicle as defined in claim 1, which further comprises in-cabin warning unit disposed in a passenger compartment of the self vehicle and adapted to visually indicate an abnormality of said blind spot detection module detected by said failure detection unit,
   wherein said in-cabin warning unit is operable to visually indicate the abnormality of the blind spot detection module when an ignition switch of the self vehicle is placed in its ON state.

16. The blind-spot detection system for vehicle as defined in claim 1, which further comprises in-cabin warning unit disposed in a passenger compartment of the self vehicle and adapted to visually indicate an abnormality of said blind spot detection module detected by said failure detection unit,
   wherein said warning unit is operable, in at least one of first and second periods: in which the first period is set when a first given time has elapsed after the ignition switch is turned ON and the second period is set when a second given time has elapsed after satisfaction of the display condition of the obstacle indicator.

17. The blind-spot detection system for vehicle as defined in claim 15 or 16, wherein said warning unit is disposed on a laterally outward side of said side mirror relative to said obstacle indicator.

18. The blind-spot detection system for vehicle as defined in claim 17, wherein said warning unit is disposed in an upper region of said side mirror.

19. The blind-spot detection system for vehicle as defined in claim 1, wherein said warning unit is designed such that a divergence angle of said indicator is enlarged in a laterally outward direction relative to that of said obstacle indicator.

20. The blind-spot detection system for vehicle as defined in claim 1, wherein
   said blind spot detection module includes:
      a left blind spot detection module which has a left-rear-side obstacle detection unit that detects an obstacle existing in the left rear side of the self vehicle and a left obstacle indicator mounted on a left side mirror of the self vehicle and adapted to display information relevant to an obstacle detected by said obstacle detection unit in left rear side, and
      a right blind spot detection module which has a right-rear-side obstacle detection unit that detects an obstacle existing in the right rear side of the self vehicle and a right obstacle indicator mounted on a right side mirror of the self vehicle and adapted to display information relevant to an obstacle detected by said obstacle detection unit in right rear side;
   said failure detection unit includes:
      a left failure detection unit for detecting that said left blind spot detection module is in an abnormal state, and
      a right failure detection unit for detecting that said right blind spot detection module is in an abnormal state; and
   said warning unit includes:
      a left warning unit mounted on the left side mirror of the self vehicle and adapted to indicate only an abnormality of said left blind spot detection module detected by said left failure detection unit, and
      a right warning unit mounted on the right side mirror of the self vehicle and adapted to indicate only an abnormality of said right blind spot detection module detected by said right failure detection unit.

21. The blind-spot detection system for vehicle as defined in claim 1, wherein
   said blind spot detection module includes:
      a left blind spot detection module which has a left-rear-side obstacle detection unit that detects an obstacle existing in the left rear side of the self vehicle and a left obstacle indicator mounted on a left side mirror of the self vehicle and adapted to display information relevant to an obstacle detected by said obstacle detection mean unit in left rear side, and
      a right blind spot detection module which has a right-rear-side obstacle detection unit that detects an obstacle existing in the right rear side of the self vehicle and a right obstacle indicator mounted on a right side mirror of the self vehicle and adapted to display information relevant to an obstacle detected by said obstacle detection mean unit in right rear side;
   said failure detection unit includes:
      a left failure detection unit for detecting that said left blind spot detection module is in an abnormal state, and
      a right failure detection unit for detecting that said right blind spot detection module is in an abnormal state; and
   said warning unit includes:
      a left warning unit mounted on the left side mirror of the self vehicle and adapted to indicate both an abnormality of said left blind spot detection module detected by said left failure detection unit, and an abnormality of said right blind spot detection module detected by said right failure detection unit, and
      a right warning unit mounted on the right side mirror of the self vehicle and adapted to indicate both an abnormality of said left blind spot detection module detected by said left failure detection unit, and an abnormality of said right blind spot detection module detected by said right failure detection unit.

22. The blind-spot detection system for vehicle as defined in claim 1, wherein
   said blind spot detection module includes
      a left blind spot detection module which has a left-rear-side obstacle detection unit that detects an obstacle existing in the left rear side of the self vehicle and a left obstacle indicator mounted on a left side mirror of the self vehicle and adapted to display information relevant to an obstacle detected by said obstacle detection unit in left rear side, and
      a right blind spot detection module which has a right-rear-side obstacle detection unit that detects an obstacle existing in the right rear side of the self vehicle and a right obstacle indicator mounted on a right side mirror of the self vehicle and adapted to display information relevant to an obstacle detected by said obstacle detection unit in right rear side;

said failure detection unit includes:

a left failure detection unit for detecting that said left blind spot detection module is in an abnormal state, and a right failure detection unit for detecting that said right blind spot detection module is in an abnormal state; and said warning unit includes left warning unit which indicates an abnormality of said left blind spot detection module detected by said left failure detection unit and right warning unit which indicates an abnormality of said right blind spot detection module detected by said right failure detection unit, wherein said left warning unit and said right warning unit are mounted on a side mirror of the self vehicle on the side of a driver's seat.

23. The blind-spot detection system for vehicle as defined in claim 1, wherein said warning unit is operable to change a display mode of the obstacle information for said obstacle indicator, to a given mode different from a normal mode so as to indicate an abnormality detected by said failure detection unit.

24. The blind-spot detection system for vehicle as defined in claim 23, wherein said obstacle indicator and said warning unit are composed of a common component.

* * * * *